US012136374B2

(12) United States Patent
Zhang et al.

(10) Patent No.: US 12,136,374 B2
(45) Date of Patent: Nov. 5, 2024

(54) DISPLAY PANEL AND DISPLAY APPARATUS

(71) Applicant: Hubei Yangtze Industrial Innovation Center Of Advanced Display Co., Ltd., Wuhan (CN)

(72) Inventors: Yuheng Zhang, Wuhan (CN); Jiemiao Pan, Wuhan (CN)

(73) Assignee: Hubei Yangtze Industrial Innovation Center Of Advanced Display Co., Ltd., Wuhan (CN)

( * ) Notice: Subject to any disclaimer, the term of this patent is extended or adjusted under 35 U.S.C. 154(b) by 0 days.

(21) Appl. No.: 18/528,700

(22) Filed: Dec. 4, 2023

(65) Prior Publication Data

US 2024/0105094 A1 Mar. 28, 2024

Related U.S. Application Data

(63) Continuation of application No. 17/810,615, filed on Jul. 4, 2022, now Pat. No. 11,875,717.

(30) Foreign Application Priority Data

Dec. 31, 2021 (CN) ......................... 202111673899.X

(51) Int. Cl.
*G09G 3/20* (2006.01)
*G09G 3/3233* (2016.01)

(52) U.S. Cl.
CPC ............ *G09G 3/20* (2013.01); *G09G 3/3233* (2013.01); *G09G 2300/0819* (2013.01);
(Continued)

(58) Field of Classification Search
CPC ...... G09G 3/32–3291; G09G 2300/0421–043; G09G 2300/0809;
(Continued)

(56) References Cited

U.S. PATENT DOCUMENTS

2009/0251496 A1* 10/2009 Saito .................... G09G 3/3283 345/690
2018/0130409 A1* 5/2018 Xiang .................. G09G 3/3233
(Continued)

FOREIGN PATENT DOCUMENTS

CN 112489591 A 3/2021
CN 113450717 A 9/2021
(Continued)

OTHER PUBLICATIONS

English translation of KR-2021080789-A (Year: 2021).*
The first Office Action received in the corresponding Chinese Application 202210121733.5, mailed Apr. 28, 2023.

*Primary Examiner* — Nathan Danielsen
(74) *Attorney, Agent, or Firm* — KILPATRICK TOWNSEND & STOCKTON LLP

(57) ABSTRACT

Provided display panel includes pixel circuit and light emitting element. The pixel circuit includes a drive module including a drive transistor, and an initialization module to provide an initialization signal to the light emitting element. Operation modes of the display panel include a first mode and a second mode, and a brightness level of the display panel in the first mode is greater than a brightness level of the display panel in the second mode. An operation process of the pixel circuit includes a data writing frame and a holding frame; the data writing frame and the holding frame in the first mode respectively correspond to an initialization signal of Vi11 and Vi12; the data writing frame and the holding frame in the second mode respectively correspond to an initialization signal of Vi21 and Vi22; where $|Vi11-Vi12| \neq |Vi21-Vi22|$.

20 Claims, 16 Drawing Sheets

(52) U.S. Cl.
CPC ............... *G09G 2300/0842* (2013.01); *G09G 2310/0237* (2013.01); *G09G 2310/08* (2013.01); *G09G 2320/0233* (2013.01); *G09G 2320/0626* (2013.01); *G09G 2330/023* (2013.01)

(58) Field of Classification Search
CPC ... G09G 2300/0819; G09G 2300/0842; G09G 2300/0861; G09G 2300/0866; G09G 2310/0264; G09G 2310/027; G09G 2310/0272; G09G 2310/0278; G09G 2310/0289; G09G 2310/06; G09G 2310/062; G09G 2310/067; G09G 2310/08; G09G 2320/0233; G09G 2320/029; G09G 2320/0295; G09G 2320/043; G09G 2320/045
See application file for complete search history.

(56) References Cited

U.S. PATENT DOCUMENTS

| | | | | |
|---|---|---|---|---|
| 2018/0293944 | A1* | 10/2018 | Kim | G09G 3/3233 |
| 2020/0074922 | A1* | 3/2020 | Cheng | G09G 3/3225 |
| 2020/0226978 | A1* | 7/2020 | Lin | G09G 3/3233 |
| 2021/0391407 | A1* | 12/2021 | Yoon | G06F 3/0412 |

FOREIGN PATENT DOCUMENTS

| | | | | |
|---|---|---|---|---|
| CN | 113571000 | A | | 10/2021 |
| KR | 2021080789 | A | * | 7/2021 |

* cited by examiner

FIG. 1 -Prior art-

DISPLAY PANEL AND DISPLAY APPARATUS

CROSS-REFERENCES TO RELATED APPLICATIONS

This is a continuation of U.S. patent application Ser. No. 17/810,615, filed Jul. 4, 2022, which claims priority to Chinese Patent Application No. 202111673899.X filed Dec. 31, 2021, the disclosures of which are incorporated herein by reference in their entireties.

FIELD

Embodiments of the present disclosure relate to the field of display technologies and, in particular, relate to a display panel and a display apparatus.

BACKGROUND

In a display panel, a pixel circuit and a light emitting element are generally provided, and a drive transistor in the pixel circuit provides a drive current to the light emitting element according to a received data signal, to drive the light emitting element to emit light so that the display panel displays a display image with corresponding brightness.

However, as use time increases, internal characteristics of the drive transistor in the pixel circuit of the display panel slowly change, causing drift of a threshold voltage of the drive transistor, which adversely affects display uniformity of the display panel. Furthermore, in different application scenarios, the display panel works in different operation modes, and the brightness levels of the display panel in different operation modes are different. However, in cases of different levels of display brightness, the threshold drifts of the drive transistor of the pixel circuit in the display panel are different, and the electric signals received by the light emitting element are also different, so that the display qualities of the image displayed on the display panel are also different.

SUMMARY

A display panel, and a display apparatus are provided according to embodiments of the present disclosure.

Embodiments of the present disclosure provide a display panel, including: a pixel circuit and a light emitting element. The pixel circuit includes a drive module, and an initialization module;

- the drive module includes a drive transistor; and the initialization module is configured to provide an initialization signal to the light emitting element. Operation modes of the display panel include a first mode and a second mode, and a brightness level of the display panel in the first mode is greater than a brightness level of the display panel in the second mode. An operation process of the pixel circuit includes a data writing frame and a holding frame; the data writing frame in the first mode corresponds to an initialization signal of Vi11, and the holding frame in the first mode corresponds to an initialization signal of Vi12; the data writing frame in the second mode corresponds to an initialization signal of Vi21, and the holding frame in the second mode corresponds to an initialization signal of Vi22; and $|Vi11-Vi12| \neq |Vi21-Vi22|$.

Embodiments of the present disclosure provide a display apparatus including a display panel, and the display panel includes: a pixel circuit and a light emitting element. The pixel circuit includes a drive module, and an initialization module; the drive module includes a drive transistor; and the initialization module is configured to provide an initialization signal to the light emitting element. Operation modes of the display panel include a first mode and a second mode, and a brightness level of the display panel in the first mode is greater than a brightness level of the display panel in the second mode. An operation process of the pixel circuit includes a data writing frame and a holding frame; the data writing frame in the first mode corresponds to an initialization signal of Vi11, and the holding frame in the first mode corresponds to an initialization signal of Vi12; the data writing frame in the second mode corresponds to an initialization signal of Vi21, and the holding frame in the second mode corresponds to an initialization signal of Vi22; and $|Vi11-Vi12| \neq |Vi21-Vi22|$.

Embodiments of the present disclosure provide a display panel, including: a pixel circuit and a light emitting element. The pixel circuit includes a drive module, an initialization module, a data writing module and a bias adjustment module; the drive module includes a drive transistor; the initialization module is configured to provide an initialization signal to the light emitting element; the data writing module is configured to provide a data signal to the drive transistor; and the bias adjustment module is configured to provide a bias adjustment signal to a first pole of the drive transistor or a second pole of the drive transistor. Operation modes of the display panel include a first mode and a second mode, and a brightness level of the display panel in the first mode is greater than a brightness level of the display panel in the second mode. In an operation process of the pixel circuit includes a data writing frame and a holding frame; the data writing frame in the first mode corresponds to an initialization signal of Vi11, and the holding frame in the first mode corresponds to an initialization signal of Vi12; the data writing frame in the second mode corresponds to an initialization signal of Vi21, and the holding frame in the second mode corresponds to an initialization signal of Vi22; and $|Vi11-Vi12| \neq |Vi21-Vi22|$.

Embodiments of the present disclosure provide a display apparatus including a display panel, and the display panel includes: a pixel circuit and a light emitting element. The pixel circuit includes a drive module, an initialization module, a data writing module and a bias adjustment module; the drive module includes a drive transistor; the initialization module is configured to provide an initialization signal to the light emitting element; the data writing module is configured to provide a data signal to the drive transistor; and the bias adjustment module is configured to provide a bias adjustment signal to a first pole of the drive transistor or a second pole of the drive transistor. Operation modes of the display panel include a first mode and a second mode, and a brightness level of the display panel in the first mode is greater than a brightness level of the display panel in the second mode. In an operation process of the pixel circuit includes a data writing frame and a holding frame; the data writing frame in the first mode corresponds to an initialization signal of Vi11, and the holding frame in the first mode corresponds to an initialization signal of Vi12; the data writing frame in the second mode corresponds to an initialization signal of Vi21, and the holding frame in the second mode corresponds to an initialization signal of Vi22; and $|Vi11-Vi12| \neq |Vi21-Vi22|$.

DETAILED DESCRIPTION

Figure 1:
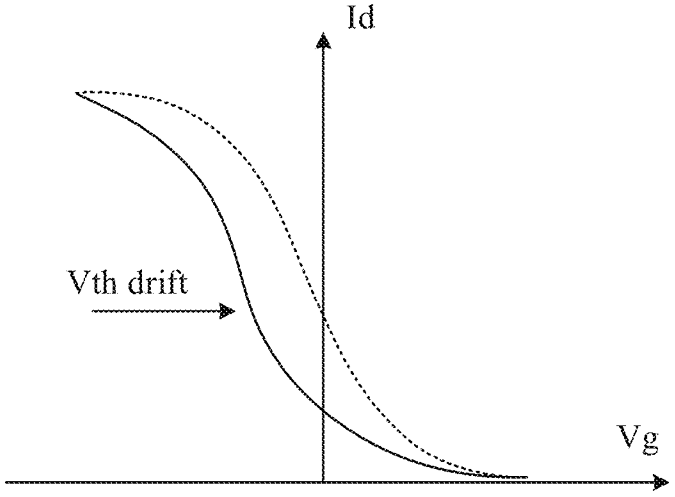
FIG. 1 is a schematic diagram of Id-Vg curve drift of a drive transistor in the related art.

The present disclosure is further described hereinafter in detail in conjunction with drawings and embodiments. It may be understood that the embodiments set forth below are intended to illustrate rather than limiting the present disclosure. Additionally, it is to be noted that, for ease of description, only part of the structure related to the present disclosure rather than the whole structure is illustrated in the drawings.

A drive transistor is provided in a pixel circuit of a display panel to provide a drive current to a current-type light emitting element and control the light emitting element to emit light. However, since the drive transistor of the pixel circuit may operate in an unsaturated state, when the drive transistor is turned on, there may be a case where a gate potential is higher than a drain potential for a P-type drive transistor, and a case where a gate potential is lower than a drain potential for an N-type drive transistor. Maintaining this condition for a long period of time may result in polarization of ions within the drive transistor, and further cause a built-in electric field to be created within the drive transistor, resulting in that the threshold voltage of the drive transistor keeps drifting. For example, FIG. 1 is a schematic diagram of Id-Vg curve drift of a drive transistor in the related art. As shown in FIG. 1, the Id-Vg curve drifts, causing the threshold voltage Vth of the drive transistor to drift accordingly, which further adversely affects the stability of the drive current provided by the drive transistor, and further adversely affects the stability of light emitting of the light emitting element. In the conventional technology, a fixed compensation signal is provided to overcome the adverse effect on the display effect of the display panel due to the threshold drift of the drive transistor. However, since in different modes, the display panel displays with different brightness levels, a voltage difference between a gate of the drive transistor and a first pole of the drive transistor and a voltage difference between a gate of the drive transistor and a second pole of the drive transistor are different, and the Id-Vg curve drifts differently, that is, the threshold voltage of the drive transistor drifts differently. As a result, using a fixed compensation signal cannot address the problem that the threshold voltage the drive transistor drift differently in different brightness modes, which does not facilitate improving of the display quality of the display panel.

In one embodiment, a corresponding initialization module may be further provided in the pixel circuit of the display panel, and the initialization module initializes the light emitting element using a fixed initialization signal to ensure that each light emitting element in the display panel can have a same initialization state, to prevent the display uniformity of the display panel from being adversely affected due to inconsistent initialization states of the light emitting element. However, when the display panel displays with different brightness levels in different modes, the voltage difference between the anode of the light emitting element and the cathode of the light emitting element varies. If the light emitting element is initialized with the fixed initialization signal, the initialization effects in different modes cannot be ensured, which causes that the accuracy of the emission brightness level of the light emitting element cannot be ensured, and the display effect of the display panel is therefore adversely affected.

In order to solve the above problems, according to the embodiments of the present disclosure, when the display panel displays with different brightness levels in different modes, different bias adjustment signals are provided for the first pole of the drive transistor or the second pole of the drive transistor, and/or different initialization signals are provided to the light emitting element, so that the bias state of the drive transistor in each mode can be adjusted accordingly, and the bias state of the drive transistor in each mode can achieve a better adjustment effect, and/or the light emitting element is initialized in different degrees for different modes, to balance the initialization effect of initialization for the light emitting element in different modes.

Based on embodiments of the present disclosure, all other embodiments obtained are within the scope of the present disclosure. Embodiments of the present disclosure are described clearly and completely hereinafter in conjunction with the drawings in the embodiments of the present disclosure.

Figure 2:
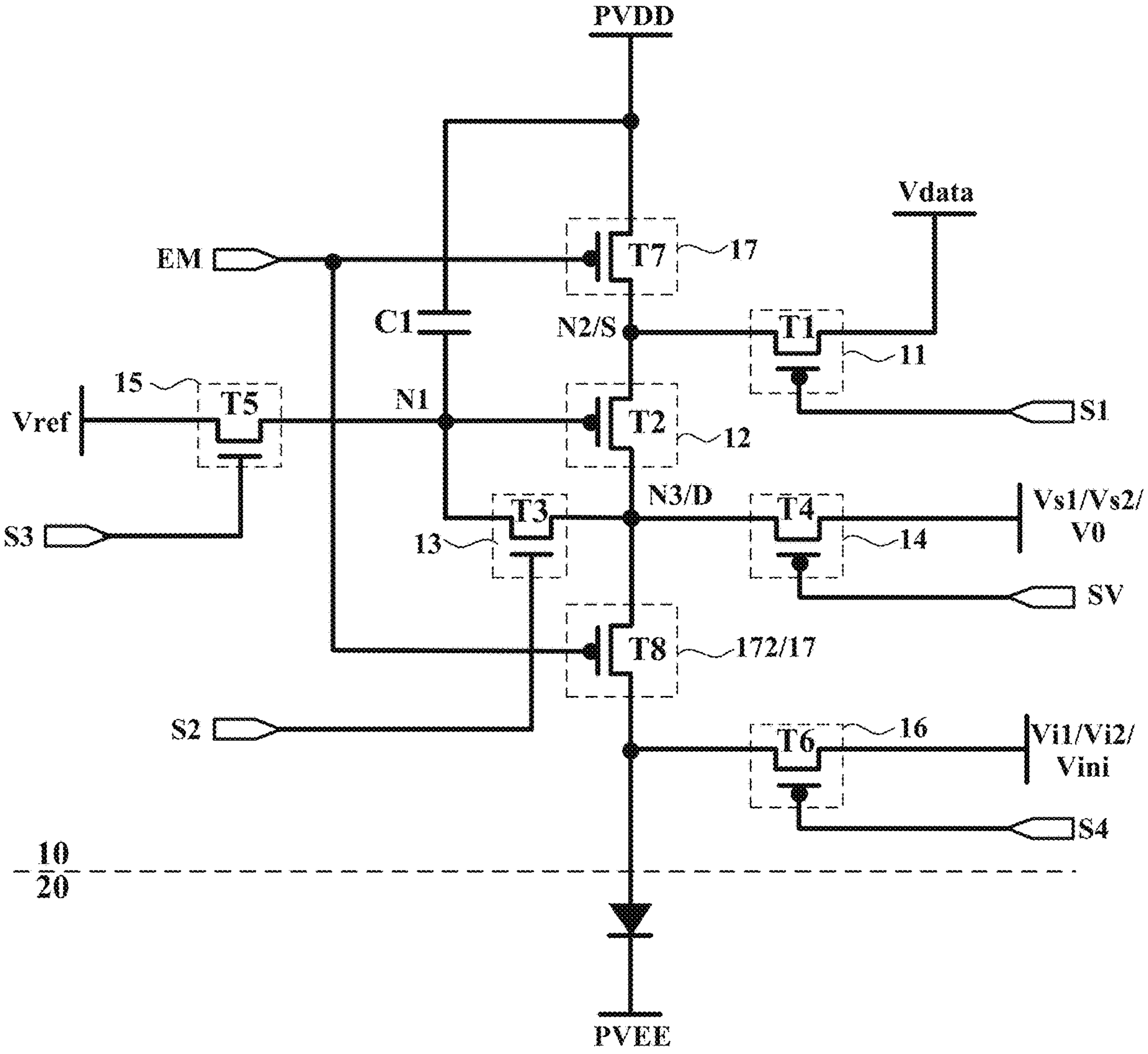
FIG. 2 is a schematic structural diagram of a pixel circuit of a display panel according to an embodiment of the present disclosure.

FIG. 2 is a schematic structural diagram of a pixel circuit of a display panel according to an embodiment of the present disclosure. As shown in FIG. 2, the display panel includes a pixel circuit 10 and a light emitting element 20. The pixel circuit 10 includes a drive module 12, a bias adjustment module 14 and an initialization module 16. The drive module 12 is configured to provide a drive current to the light emitting element 20, and the drive module 12 includes a drive transistor T2. The bias adjustment module 14 is configured to provide a bias adjustment signal V0 to a first pole of the drive transistor T2 or a second pole of the drive transistor T2. The initialization module 16 is configured to provide an initialization signal Vini to the light emitting element 20. Operation modes of the display panel may include a first mode and a second mode, and a brightness level of the display panel in the first mode is greater than a brightness level of the display panel in the second mode. The bias adjustment signal Vs1 in the first mode and the bias adjustment signal Vs2 in the second mode satisfies Vs1≠Vs2; and/or, the initialization signal Vi1 in the first mode and the initialization signal Vi2 in the second mode satisfies Vi1≠Vi2. It should be noted that, in the present embodiments, in some implementations, the display panel further includes an integrated chip, which is used to provide the bias adjustment signal and the initialization signal mentioned in the above or in the following. In other embodiments, the bias adjustment signal and the initialization signal may also be provided by other mechanism, which is not limited herein.

As the light emitting element 20 enters a light-emitting stage, the drive module 12 of the pixel circuit 10 may provide, according to a received data signal, a corresponding drive current to the light emitting element 20, and the emission brightness level of the light emitting element 20 may depend on a magnitude of the drive current provided by the drive module 12. In this case, one terminal of the drive module 12 can receive a data signal, and another terminal of the drive module 12 can be coupled to the light emitting element 20. When the drive module 12 includes the drive transistor T2, the data signal received by the drive module 12 may be written into a gate of the drive transistor T2, so that the drive transistor T2 can generate, in the light-emitting stage, a corresponding drive current according to a gate-source voltage difference and a threshold voltage of the drive transistor T2, to allow the light emitting element to exhibit a corresponding emission brightness, where the gate-source voltage difference is a voltage difference between the gate of the drive transistor T2 and a source of the drive transistor T2.

In different application scenarios, the display panel may display with different brightness levels. For example, a display brightness level when the display panel displays a white image may be greater than a display brightness level when it displays a black image, and a display brightness level displayed by the display panel when an external ambient light is relatively strong may be greater than a display brightness level displayed by the display panel when the external ambient light is relatively weak. Also, at different brightness levels, the gate of the drive transistor T2 may receive different data signals, which causes the Id-Vg curve of drive transistor to have different drifts, that is, the threshold voltage of the drive transistor to have different drifts. In this case, the bias adjustment module 14 of the pixel circuit 10 provides the bias adjustment signal V0 to the first pole of the drive transistor T2 or the second pole of the drive transistor T2, and in different modes, the bias adjustment module 14 provides different bias adjustment signals V0 to the first pole of the drive transistor T2 or the second pole of the drive transistor T2, so that the first pole of the drive transistor T2 or the second pole of the drive transistor T2 receives different voltages in different brightness modes, to adaptively adjust the voltage difference between the gate of the drive transistor T2 and the first pole of the drive transistor T2 or between the gate of the drive transistor T2 and the second pole of the drive transistor T2 for different brightness modes, and alleviating or eliminating the drifts of the threshold voltage of the drive transistor T2 in different brightness modes. Therefore, the bias state of the drive transistor T2 in each brightness mode can be adjusted correspondingly, so that the bias state of the drive transistor T2 in each brightness mode achieves a better adjustment effect, and further, the display uniformity of the display panel can be improved in each of the different brightness modes, and the display quality of the display panel is significantly improved.

For example, the bias adjustment module 14 may be turned on or off under the control of a scan signal SV. When the scan signal SV controls the bias adjustment module 14 to be turned on, the bias adjustment module 14 can transmit the bias adjustment signal V0 to the first pole of the drive transistor T2 or the second pole of the drive transistor T2. In this case, the bias adjustment module 14 may include a bias adjustment transistor T4, a gate of the bias adjustment transistor T4 may receive the scan signal SV, a first pole of the bias adjustment transistor T4 may receive the bias adjustment signal V0, and a second pole of the bias adjustment transistor T4 is electrically connected to the first pole of the drive transistor or the second pole of the drive transistor T2. The scan signal is generally a pulse signal, and the transistor can be controlled to turn on by a high level or a low level of the pulse signal or to turn off by a high level or a low level of the pulse signal. In the embodiments of the present disclosure, the bias adjustment transistor T4 may be an N-type transistor or a P-type transistor. In a case where the bias adjustment transistor T4 is an N-type transistor, when the scan signal SV is high level, the bias adjustment transistor T4 is turned on, and when the scan signal SV is low level, the bias adjustment transistor T4 is turned off. In contrast, in a case where the bias adjustment transistor T4 is a P-type transistor, when the scan signal SV is low level, the bias adjustment transistor T4 is turned on, and when the scan signal SV is high level, the bias adjustment transistor T4 is turned off. The type of the bias adjustment transistor T4 is not specifically limited in the embodiments of the present disclosure.

It should be noted that when the first pole of the drive transistors T2 is a source thereof, the second pole of the drive transistors T2 is a drain thereof, and when the second pole of the drive transistors T2 is a source thereof, the first pole of the drive transistors T2 is a drain thereof. FIG. 2 shows a case, only for example, where the bias adjustment module 14 is electrically connected to the drain D of the drive transistor T2 at a node N3 to provide the bias adjustment signal to the drain of the drive transistor T2, to adjust the voltage difference between the gate of the drive transistor T2 and the drain of the drive transistor T2 and to adjust the voltage difference between the source of the drive transistor T2 and the drain of the drive transistor T2 in different modes. In the present embodiments of the present disclosure, however, as shown in FIG. 3, the bias adjustment module 14 may also be electrically connected to a source S of the drive transistor T2 at a node N2 to provide a bias adjustment signal to the source of the drive transistor T2 to adjust the voltage difference between the gate and the source of the drive transistor T2 and to adjust the voltage difference between the source and the drain of the drive transistor T2 in different modes.

Figure 3:
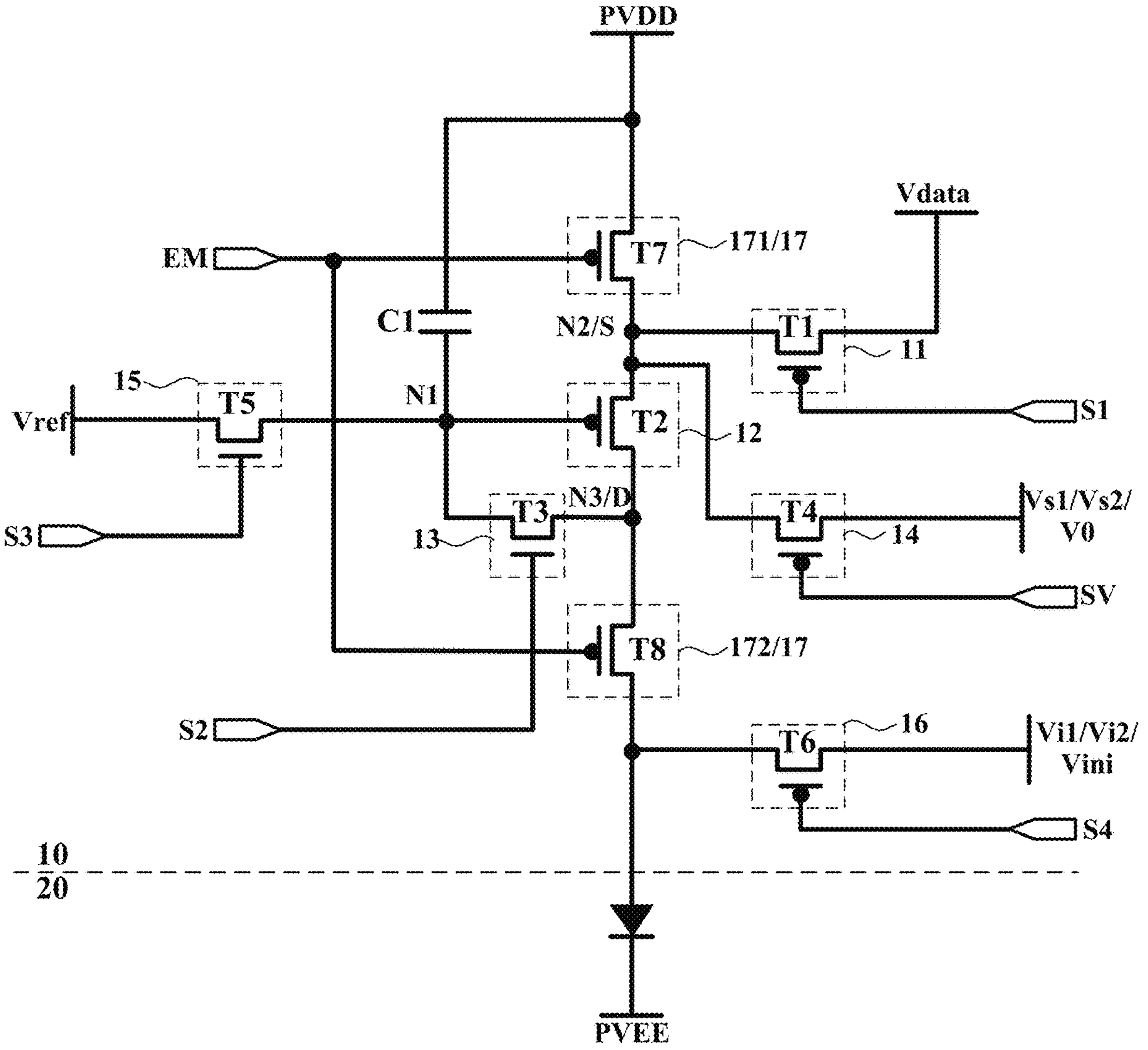
FIG. 3 is a schematic structural diagram of another pixel circuit of a display panel according to an embodiment of the present disclosure.
Figure 4:
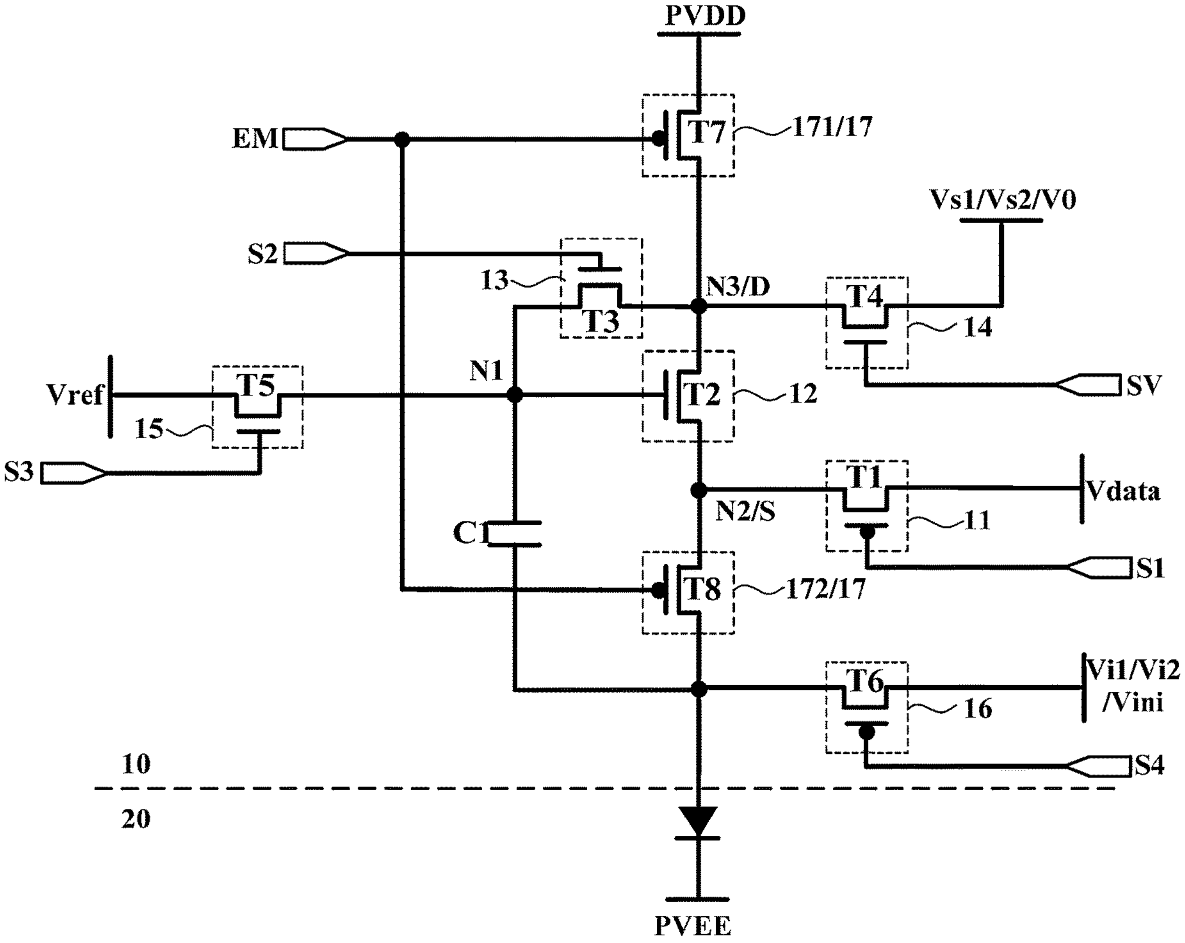
FIG. 4 is a schematic structural diagram of still another pixel circuit of a display panel according to an embodiment of the present disclosure.
Figure 5:
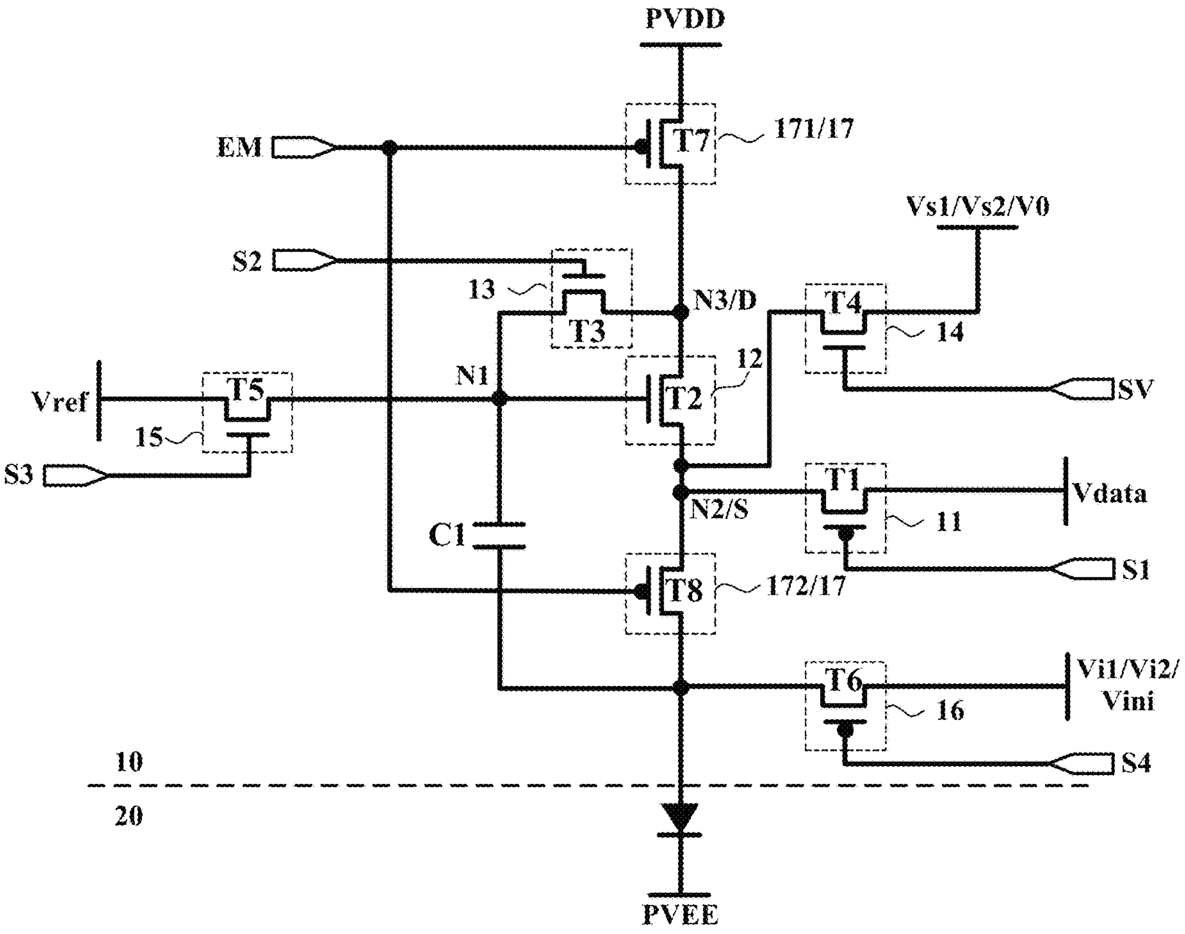
FIG. 5 is a schematic structural diagram of still another pixel circuit of a display panel according to an embodiment of the present disclosure.

It may be understood that both FIG. 2 and FIG. 3 exemplarily show that the drive transistor T2 of the pixel circuit 10 is a P-type transistor, in this case, the drain D of the drive transistor T2 is coupled to the light emitting element 20, and the source S of the drive transistor T2 receives the data signal and transmits the received data signal to the gate G of the drive transistor T2. However, embodiments of the present application may also be as shown in FIG. 4 and FIG. 5, in which the drive transistor T2 of the pixel circuit 10 may also be an N-type transistor, and in this case, the source S of the drive transistor T2 is further coupled to the light emitting element 20 while it is used for receiving the data signal. Further, a source or a drain of a transistor are not fixed forever, but may change as a driving state of the transistor changes.

For convenience of description, the pixel circuit, by default, is taken that shown in FIG. 2 as an example for illustrating the embodiments of the present disclosure.

Further referring to FIG. 2, an initialization module 16 is further provided in the pixel circuit 10. One terminal of the initialization module 16 is used for receiving an initialization signal Vini, and another terminal of the initialization module 16 is electrically connected to the anode of the light emitting element 20, and the cathode of the light emitting element 20 can receive a power supply signal PVEE. The initialization module 16 can provide an initialization signal Vini to the anode of the light emitting element 20 before the light emitting element 20 enters the light-emitting stage, to initialize the light emitting element 20 to enable the light emitting element 20 to stably emit light after entering the light-emitting stage. In one embodiment, since the display panel displays with different brightness levels in different modes so that initializations required by the light emitting element 20 are different, therefore, the initialization module 16 can provide different initialization signals Vini to the anode of the light emitting element 20 in different brightness modes, to allow the anode of the light emitting element 20 to have different voltages in different modes to adaptively adjust the voltage difference between the anode of the light emitting element and the cathode of the light emitting element 20 for different brightness modes, whereby initializing the light emitting element 20 differently in different brightness modes, balancing the initialization effects of initializing the light emitting element 20 in different brightness modes, and further ensuring that the light emitting element 20 can emit light accurately in different brightness modes, improving the display effect of the display panel.

For example, the initialization module 16 may be turned on or off under the control of a scan signal S4, and when the scan signal S4 controls the initialization module 16 to be turned on, the initialization module 16 can transmit the initialization signal Vini to the anode of the light emitting element 20 to initialize the light emitting element 20. In this case, the initialization module 16 may include an initialization transistor T6, a gate of the initialization transistor T6 may receive the scan signal S4, a first pole of the initialization transistor T6 may receive the initialization signal Vini, and a second pole of the initialization transistor T6 may be electrically connected to the anode of the light emitting element 20. The initialization transistor T6 may be an N-type transistor or a P-type transistor. In a case where the initialization transistor T6 is an N-type transistor, when the scan signal S4 is high level, the initialization transistor T6 is turned on, and when the scan signal S4 is low level, the initialization transistor T6 is turned off. In contrast, in a case where the initialization transistor T6 is a P-type transistor, when the scan signal S4 is low level, the initialization transistor T6 is turned on, and when the scan signal S4 is high level, the initialization transistor T6 is turned off. The type of the initialization transistor T6 is not specifically limited in the present embodiments of the present disclosure.

It is to be noted that in embodiments of the present disclosure, it may only adjust the magnitude of the bias adjustment signal V0 for different brightness modes of the display panel, it may only adjust the magnitude of the initialization signal Vini for different brightness modes of the display panel, or, it may adjust both the bias adjustment signal V0 and the initialization signal Vini for different brightness modes of the display panel, which is not specifically limited in the embodiments of the present disclosure.

Further, the operation modes of the display panel mentioned in the embodiments of the present disclosure include a first mode and a second mode, however the first mode and the second mode do not simply refer to that the display panel can only works in two operation modes, but are uses to represents that the display panel can works in various operation modes, and in different operation modes, the display panel will display with different brightness levels. In embodiments of the present disclosure, in different application scenarios, the display panel work in different operation modes so that the display panel displays with different brightness levels. For convenience of description, the operation modes of the display panel including two modes (the first mode and the second mode) may be taken as an example, to illustrate the embodiments of the present disclosure.

In some embodiments, a brightness level of the display panel includes a first brightness level segment and a second brightness level segment, a brightness level values within the first brightness level segment are greater than a brightness level values within the second brightness level segment. Within the first brightness level segment, the bias adjustment signal is unchanged, and the bias adjustment signal within the second brightness level segment is unchanged, and the bias adjustment signals in the first brightness level segment is not equal to the bias adjustment signals in the second brightness level segment; and/or, the initialization signal within the first brightness level segment is unchanged, and the initialization signal within the second brightness level segment is unchanged, and the initialization signal within the first brightness level segment is not equal to the initialization signal within the second brightness level segment.

With continued reference to FIG. 2, when the display panel displays an image, the display panel may display with different brightness levels depending on the content of the image displayed on the display panel and/or the environment in which the display panel is located. When the brightness level of the display panel changes within a small brightness level range, the data signal received by the drive transistor T2 in the pixel circuit 10 will change within a small range so that the drift of threshold voltage of the drive transistor T2 also changes within a small range, and in this case, the bias adjustment module 14 may provide a same bias adjustment signal V0 to the first pole of the drive transistor or the second pole of the drive transistor T2, and the voltage difference between the gate of the drive transistor T2 and the first pole of the drive transistor T2 or between the gate of the drive transistor T2 and the second pole of the drive transistor T2 may be ameliorated, to achieve alleviating or eliminating the drifts of the threshold voltage of the drive transistor T2 within this brightness level range. In one embodiment, when the brightness level of the display panel changes within a small brightness level range and the bias adjustment signal V0 is still provided as a fixed signal, the power consumption due to frequent switching between different bias adjustment signals V0 can be reduced, that is, a low power consumption of the display panel can be facilitated.

However, when the brightness the display panel varies in a large brightness level range from the darkest to the brightest, it may cause the data signal received by the drive transistor T2 to change greatly, therefore, the brightness level of the display panel may be divided into different brightness level segments from the darkest to the brightest, and different brightness level segments may correspond to different operation modes of the display panel. For example, the brightness level of the display panel may be divided into a first brightness level segment and a second brightness level segment from the darkest to the brightest, and the brightness level of the display panel may be changed within the first brightness level segment when the operation mode of the display panel is the first mode, and the brightness level of the display panel may be changed within the second brightness level segment when the operation mode of the display panel is the second mode. The data signals received by the drive transistor T2 within a same brightness level segment may change slightly, and a same bias adjustment signal may be used. However, the data signals received by the drive transistors T2 in different brightness level segments may change greatly, and different bias adjustment signals V0 have to be used to adjust the bias states of the drive transistor T2 in different brightness level segments, so that the bias states of the drive transistors T2 in different brightness level segments can each achieve a better adjustment effect, and the display uniformity of the display panel can be improved in each of the different brightness level segments, so that the display quality of the display panel is significantly improved.

Accordingly, when the brightness level of the display panel changes within one brightness level segment, the electrical signal in the light emitting element 20 also changes within a small range. In this case, the initialization module 16 can provide a same initialization signal Vini to the light emitting element 20, and the voltage difference between the anode of the light emitting element and the cathode of the light emitting element 20 may be ameliorated to initialize the light emitting element 20. Similarly, when the brightness level of the display panel changes within one brightness level segment and the initialization signal Vini is still provided as a fixed signal, power consumption due to frequent switching between different initialization signals Vini can be reduced, that is, low power consumption of the display panel can be facilitated. Furthermore, the electrical signals in the light emitting element 20 in different brightness level segments may change greatly, and different initialization signals Vini may be used to adjust the initialization states of the light emitting element 20 in different brightness level segments, to balance the initialization effects of the light emitting element 20 in different brightness level segments, and further to ensure that the light emitting element 20 can emit light accurately in each of the different modes, and improving the display effect of the display panel.

In some embodiments, a difference between a highest brightness level value of the first brightness level segment and a lowest brightness level value of the first brightness level segment is ΔL1, and a difference between a highest brightness level value of the second brightness level segment and a lowest brightness level value of the second brightness level segment is ΔL2, satisfying ΔL1>ΔL2.

The brightness level of the display panel may be determined by an emission brightness level of a light emitting element thereof, and the emission brightness level of the light emitting element may be represented by a grayscale, and may be divided into 256 grayscales in total from 0 to 255, and the brightness level of the light emitting element gradually increases from grayscale 0 to grayscale 255. Generally, when the emission brightness level of the light emitting element is low, a slight change in the emission brightness level can be detected by the human eye; however, when the emission brightness level of the light emitting element is high, the human eye is not sensitive to the change in the emission brightness, and only can detect the change in the brightness level when the change is great. In this way, the brightness level difference (ΔL2) in the lower brightness level segment of the display panel can be made smaller than the brightness level difference (ΔL1) in the higher brightness level segment, so that the same bias adjustment signal and/or the same initialization signal are used when the brightness level of the display panel changes within the same brightness level segment, and different bias adjustment signals and/or different initialization signals are used when the brightness level of the display panel changes within different brightness level segments, and ensuring that high display uniformity can be achieved when the brightness level of the display panel changes within each brightness level segment, so that the display panel has a better display effect.

In the present embodiments of the present disclosure, the brightness level of the display panel can be adjusted according to practical requirements, and for the brightness level adjustment mode of the display panel, it is not specifically limited in embodiments of the present disclosure. The brightness level adjustment mode of the display panel is described hereinafter with reference to a typical example.

In some embodiments, one image frame of the display panel may include a non-light-emitting stage and a light-emitting stage, and a duration of the light-emitting stage in the first mode is greater than a duration of the light-emitting stage in the second mode.

With continued reference to FIG. 2, in the light-emitting stage, the light emitting element 20 driven by the pixel circuit 10 receives a drive current and emits light according to the drive current; in the non-light-emitting stage, the light emitting element 20 does not receive the drive current and would not emit light according to the drive current. In one image frame of the display panel, the longer the duration of the light-emitting stage is, the longer the light emitting time of the light emitting element is, and the greater an integral value of the emission brightness level of the light emitting element received by the human eye with respect to the time is, so that the display brightness level of the image frame viewed by the human eye is higher. In this way, the brightness level of the display panel in different modes can be correspondingly controlled by controlling the duration of the light-emitting stage in different modes.

The duration of the light-emitting stage in one image frame of the display panel may be achieved by controlling the duration of providing drive current to the light emitting element 20. In this case, the pixel circuit 10 may further include a light emitting control module 17, and the light emitting control module 17 can control the drive transistor T2 to provide a drive current to the light emitting element 20. The light emitting control module 17 can be turned on or off under the control of a light emitting control signal EM. When the light emitting control signal EM controls the light emitting control module 17 to be turned on, the light emitting control module 17 can control the drive transistor T2 to provide the drive current to the light emitting element 20, and when the light emitting control signal EM controls the light emitting control module 17 to be turned off, the drive transistor T2 cannot provide the drive current to the light emitting element 20. In this manner, the on-duration of the light emitting control module 17 can be controlled by the light emitting control signal EM, to control the duration of the drive transistor T2 providing a drive current to the light emitting element 20, that is, to control the light emitting duration of the light emitting element 20, and realizing controlling the duration of the light-emitting stage. For example. when the operation mode of the display panel is the first mode, the light emitting control signal EM may control the light emitting control module 17 to have a longer on-duration, and when the operation mode of the display panel is the second mode, the light emitting control signal EM may control the light emitting control module 17 to have a shorter on-duration.

The light emitting control module 17 may include a first light emitting control unit 171 and a second light emitting control unit 172. The first light emitting control unit 171 and the second light emitting control unit 172 may be turned on or off under the control of the same light emitting control signal EM. A first terminal of the first light emitting control unit 171 may receive a positive power supply signal PVDD, and a second terminal of the first light emitting control unit 171 may be electrically connected to the drive transistor T2 at the node N2. A first terminal of the second light emitting control unit 172 may be electrically connected to the drive transistor T2 at the node N3, a second terminal of the second light emitting control unit 172 may be electrically connected to the anode of the light emitting element 20, and a cathode of the light emitting element 20 receives a negative power supply signal PVEE. In this case, when the light emitting control signal EM controls the first light emitting control unit 171 and the second light emitting control unit 172 to be turned on at a same time, a current path is formed between the positive power supply signal PVDD and the negative power supply signal PVEE so that the drive current provided from the drive transistor T2 is transmitted to the light emitting element 20 to allow the light emitting element 20 to emit light according to a received drive current.

For example, the first light emitting control unit 171 may include a first light emitting control transistor T7, and the second light emitting control unit 172 may include a second light emitting control transistor T8. When the drive transistor T2 is a P-type transistor, referring to FIG. 2 and FIG. 3, both the gate of the first light emitting control transistor T7 and the gate of the second light emitting control transistor T8 receive the light emitting control signal EM, a first pole of the first light emitting control transistor T7 receives the positive power supply signal PVDD, a second pole of the first light emitting control transistor T7 is electrically connected to the source of the drive transistor T2. A first pole of the second light emitting control transistor T8 is electrically connected to the drain of the drive transistor T2, and a second pole of the second light emitting control transistor T8 is electrically connected to the anode of the light emitting element 20. The light emitting control signal EM may be a pulse signal, and in a case where the first light emitting control transistor T7 and the second light emitting control transistor T8 are both N-type transistors, a high level of the light emitting control signal EM controls the first light emitting control transistor T7 and the second light emitting control transistor T8 to be turned on, and a low level of the light emitting control signal EM controls the first light emitting control transistor T7 and the second light emitting control transistor T8 to be turned off. In a case where the first light emitting control transistor T7 and the second light emitting control transistor T8 are both P-type transistors, a low level of the light emitting control signal EM controls the first light emitting control transistor T7 and the second light emitting control transistor T8 to be turned on, and a high level of the light emitting control signal EM controls the first light emitting control transistor T7 and the second light emitting control transistor T8 to be turned off. In this manner, the on-duration of each of the first light emission control transistor T7 and the second light emission control transistor T8 (i.e., the duration of the light emission stage) can be controlled by controlling a duty ratio of the light emission control signal EM.

Accordingly, referring to FIG. 4 to FIG. 5, a difference of the case where the drive transistor T2 is an N-type transistor, from the case where the drive transistor T2 is a P-type transistor lies in that a second pole of the first light emitting control transistor T7 is electrically connected to a drain of the drive transistor T2 and a first pole of the second light emitting control transistor T8 is electrically connected to a source of the drive transistor T2.

Figure 6:
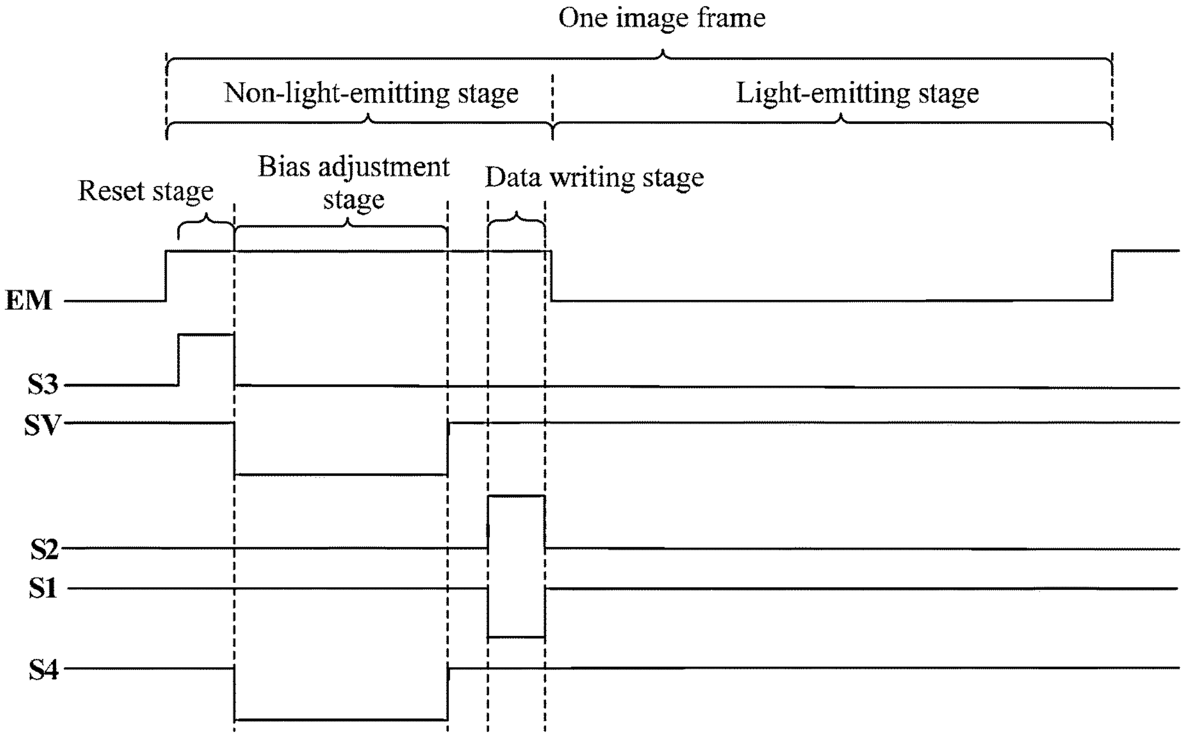
FIG. 6 is a driving timing diagram of the pixel circuit corresponding to FIG. 2.

For example, taking each of the drive transistor, the first light emitting control transistor and the second light emitting control transistor being of P-type transistor as an example, FIG. 6 is a driving timing diagram of the pixel circuit corresponding to FIG. 2. Referring to FIG. 2 and FIG. 6, an image frame displayed by the display panel includes a non-light-emitting stage and a light-emitting stage. In the non-light-emitting stage, the light emitting control signal EM is high level that controls the first light emitting control transistor T7 and the second light emitting control transistor T8 to be in an off state, and in this case, a bias adjustment signal and a data signal can be sequentially provided to the drive transistor T2. In the light-emitting stage, the light emitting control signal EM is low level that controls the first light emitting control transistor T7 and the second light emitting control transistor T8 to be in an on state, and in this case, a current path is formed between the positive power supply signal PVDD and the negative power supply signal PVEE so that the drive current provided by the drive transistor T2 is transmitted to the light emitting element 20 to control the light emitting element 20 to emit light. In this way, by controlling the duration of the light emission control signal EM being a low level, the duration of the light-emitting stage can be controlled, and realizing controlling the brightness level of the image displayed on the display panel.

Figure 7:
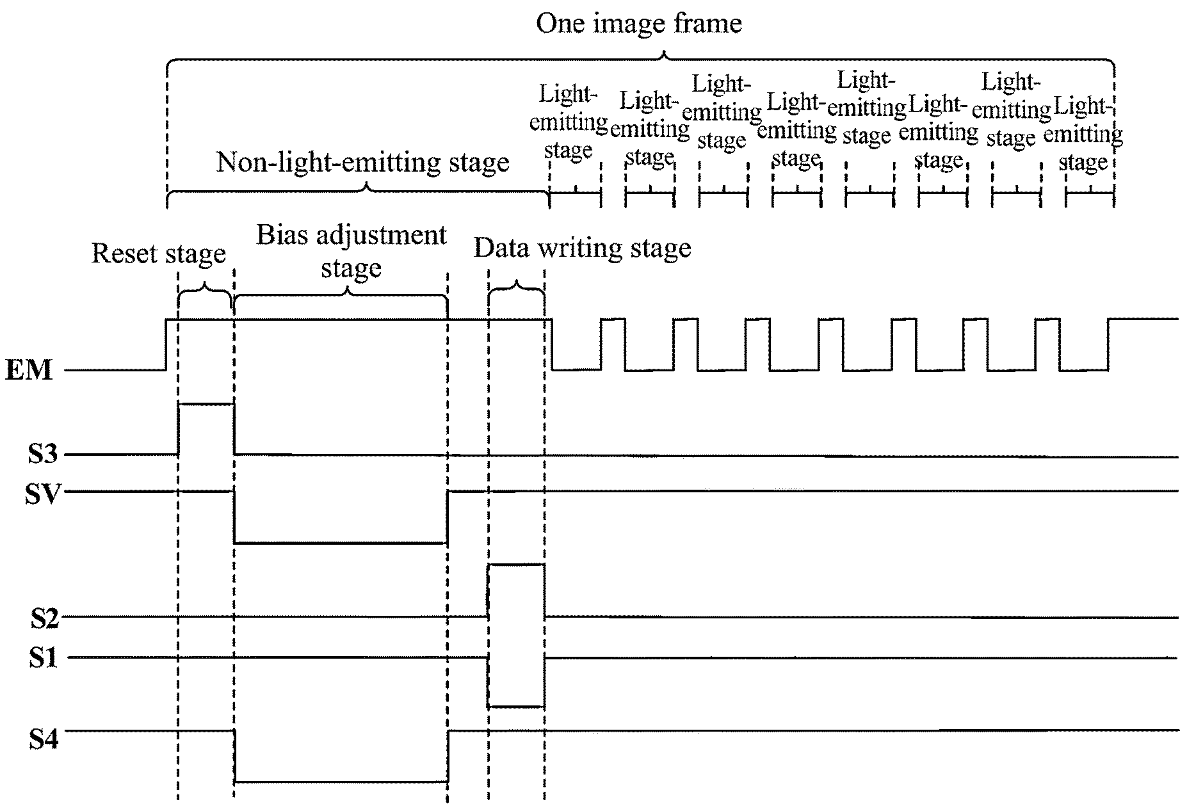
FIG. 7 is a driving timing diagram of a pixel circuit according to an embodiment of the present disclosure.

It should be noted that, FIG. 6 only takes a case where the light-emitting stage and the non-light-emitting stage are successive stages while one image frame is displayed on the display panel for example. However, in the embodiments of the present disclosure, the light-emitting stage may be composed of multiple light-emitting stages spaced-apart (as shown in FIG. 7) while one image frame is displayed on the display panel, which is not specifically limited in the embodiments of the present disclosure.

It may be understood that, with reference to FIG. 2 to FIG. 3, in a case where the drive transistor is a P-type transistor, in an operation mode in which the display panel has a higher brightness, the duration of the light-emitting stage is longer, and the drift of the threshold voltage of the drive transistor T2 is mainly due to that the drive transistor T2 is in an unsaturated state in the light-emitting stage, and there is a voltage difference between any two of the gate of the drive transistor T2, the source of the drive transistor T2, and the drain of the drive transistor T2, which causes that the longer the duration of the light-emitting stage is, the more obvious the drift of the threshold voltage of the drive transistor T2 is. Therefore, for the P-type drive transistor, when the duration of the light-emitting stage of one image frame is longer, a larger bias adjustment signal V0 is required to adjust the threshold voltage of the drive transistor T2, to alleviate or eliminate the threshold voltage drift of the drive transistor T2. In this case, when the drive transistor T2 is a P-type transistor, and the brightness level of the display panel is high, a large bias adjustment signal is provided to the first pole of the drive transistor or the second pole of the drive transistor T2; and when the drive transistor T2 is a P-type transistor, and the brightness level of the display panel is low, a small bias adjustment signal is provided to the first pole of the drive transistor or the second pole of the drive transistor T2. For example, the brightness level of the display panel in the first mode is greater than the brightness level of the display panel in the second mode, so that the duration of the light-emitting stage in the first mode is greater than the duration of the light-emitting stage in the second mode, and in this case, a voltage Vs1 of the bias adjustment signal in the first mode and a voltage Vs2 of the bias adjustment signal in the second mode satisfy Vs1>Vs2.

In some embodiments, since it is relative that the brightness level of the display panel is high or low is relative, that is, it is relative that the duration of the light-emitting stage in one image frame of the display panel is long or short, therefore, an appropriate solution may be selected depending on a specific brightness level and a specifical brightness level difference. In other embodiments, when the drive transistor T2 is a P-type transistor, for the case where the duration of the light-emitting stage in the first mode is greater than the duration of the light-emitting stage in the second mode, the voltage Vs1 of the bias adjustment signal in the first mode and the voltage Vs2 of the bias adjustment signal in the second mode may also satisfy Vs1<Vs2.

Further, referring to FIG. 4 to FIG. 5, the drift direction of threshold voltage of an N-type drive transistor T2 is opposite to the drift direction of the threshold voltage of a P-type transistor, so that when the duration of the light emission stage in one image frame is long, a small bias adjustment signal V0 is required to adjust the threshold voltage of the drive transistor T2 to alleviate or eliminate the threshold voltage drift of the drive transistor T2; that is, when the drive transistor T2 is an N-type transistor, and the brightness level of the display panel is high, a small bias adjustment signal is provided to the first pole of the drive transistor or the second pole of the drive transistor T2; and when the drive transistor T2 is an N-type transistor, and the brightness level of the display panel is low, a large bias adjustment signal is provided to the first pole of the drive transistor or the second pole of the drive transistor T2. For example, the brightness level of the display panel in the first mode is greater than the brightness level of the display panel in the second mode, so that the duration of the light-emitting stage in the first mode is greater than the duration in the second mode, and the voltage Vs1 of the bias adjustment signal in the first mode and the voltage Vs2 of the bias adjustment signal in the second mode satisfy Vs1<Vs2.

In other embodiments, when the drive transistor T2 is an N-type transistor, for the case where the duration of the light emission stage in the first mode is greater than the duration of the light emission stage in the second mode, the voltage Vs1 of the bias adjustment signal in the first mode and the voltage Vs2 of the bias adjustment signal in the second mode may also satisfy Vs1>Vs2.

In some embodiments, with continued reference to FIG. 2, the pixel circuit 10 further includes a data writing module 11 configured to provide a data signal to the drive transistor T2; where the data signal received by the drive transistor T2 in the first mode is not equal to the data signal received by the drive transistor T2 in the second mode, that is, the data signal received by the drive transistor T2 in the first mode is smaller or greater than the data signal received by the drive transistor T2 in the second mode.

When the data signals Vdata received by the drive transistor T2 are different, the drive currents generated by the drive transistor T2 are different, and the emission brightness level of the light emitting element 20 are different under the control of the different drive currents. The brightness level of the display panel are different when the display panel is in different operation modes, and the brightness level of the display panel may be determined by the emission brightness level of the light emitting element 20, therefore, when the display panel is in different operation modes, the light emitting element 20 may have different emission brightness levels, and in this case, the data writing module 11 may provide different data signals to the drive transistor T2, to allow the drive transistor T2 to generate different drive currents. Generally, when the drive current provided by the drive transistor T2 to the light emitting element 20 is larger, the emission brightness level of the light emitting element 20 is higher.

For example. one terminal of the data writing module 11 may receive a data signal Vdata, the other terminal of the data writing module 11 may be electrically connected to the source of the drive transistor T2 at the node N2, and the data writing module 11 may be turned on or off under the control of a scan signal S1. When the scan signal S1 controls the data writing module 11 to be turned on, the data writing module 11 can write the data signal Vdata to the source of the drive transistor T2, and transfer the data signal Vdata from the source of the drive transistor T2 to the gate of the drive transistor T2, to allow the drive transistor T2 to provide corresponding drive current according to the data signal Vdata. In this case, the data writing module 11 may include a data writing transistor T1. A gate of the data writing transistor T1 may receive the scan signal S1, a first pole of the data writing transistor T1 may receive the data signal Vdata, and a second pole of the data writing transistor T1 is electrically connected to the source of the drive transistor T2. The data writing transistor T1 may be an N-type transistor or a P-type transistor. In a case where the data writing transistor T1 is an N-type transistor and when the scan signal S1 is high level, the data writing transistor T1 is turned on, and when the scan signal S1 is low level, the data writing transistor T1 is turned off. In contrast, in a case where the data writing transistor T1 is a P-type transistor, and when the scan signal S1 is low level, the data writing transistor T1 is turned on, and when the scan signal S1 is high level, the data writing transistor T1 is turned off. The type of the data writing transistor T1 is not specifically limited by the embodiments of the present disclosure/this embodiment of the present disclosure.

It is to be noted that, the drive transistor T2 shown in each of FIG. 2 and FIG. 3 is a P-type transistor, and for the P-type drive transistor T2, the drive current I generated by the drive transistor T2 is positively related to $k(PVDD-Vdata)^2$. Since PVDD is generally a constant value, and the value of the drive current I is positively related to $(PVDD-Vdata)^2$, when the PVDD is always larger than Vdata, the Vdata is smaller, the drive current I is larger, and in this case, the voltage of the data signal received by the drive transistor T2 in the first mode is smaller than the voltage of the data signal received by the drive transistor T2 in the second mode; and when the PVDD is always smaller than the Vdata, the Vdata is larger, the drive current I is larger, and in this case, the voltage of the data signal received by the drive transistor T2 in the first mode is smaller than the voltage of the data signal received by the drive transistor T2 in the second mode. When the value of PVDD is between a minimum value of Vdata and a maximum value of Vdata, it is determined depending on the specific display situation that the voltage of the data signal received by the drive transistor T2 in the first mode is higher or lower than the voltage of the data signal received by the drive transistor T2 in the second mode.

Accordingly, as shown in FIG. 4 and FIG. 5, the drive transistor T2 may also be an N-type transistor. For the solution in which the drive transistor T2 is an N-type transistor, the principle is similar to that of the solution in which the drive transistor T2 is a P-type transistor, and it is determined depending on the specific display situation that the voltage of the data signal received by the drive transistor T2 in the first mode is higher or lower than the voltage of the data signal received by the drive transistor T2 in the second mode.

It may be understood that, with reference to FIG. 2 to FIG. 3, in a brightness level range, when the drive current generated by the drive transistor T2 is greater, the emission brightness level of the light emitting element 20 is higher, and the brightness level of the display panel is higher. In a case where the drive transistor T2 is a P-type transistor, and when the drive current is large, the voltage of the data signal provided by the data writing module 11 is small, so that the gate voltage of the drive transistor T2 is small, the voltage difference between the gate of the drive transistor T2 and the first pole of the drive transistor or the second pole of the drive transistor T2 is larger, the Id-Vg curve of the drive transistor T2 is prone to drift, causing the threshold voltage drift of the drive transistor T2 to be more severer, and in this case, the bias state of the drive transistor T2 can be quickly adjusted by a larger bias adjustment signal. That is, when the brightness level of the display panel is high, a larger bias adjustment signal V0 is provided to the first pole of the drive transistor T2 or the second pole of the drive transistor T2. When the brightness level of the display panel is low, a small bias adjustment signal is provided to the first pole of the drive transistor T2 or the second pole of the drive transistor T2. That is, when the voltage of the data signal provided to the drive transistor T2 in the first mode is lower than the voltage of the data signal provided to the drive transistor T2 in the second mode, the voltage Vs1 of the bias adjustment signal in the first mode and the voltage Vs2 of the bias adjustment signal in the second mode satisfy Vs1>Vs2.

In other embodiments, for the case where the drive transistor T2 is a P-type transistor, since in a brightness level range, the brightness level of the display panel is low, the emission brightness level of the light emitting element 20 is low, and the drive current generated by the drive transistor T2 is small. In this case, the voltage difference between the source of the drive transistor T2 and the drain of the drive transistor T2 is large, and because the gate voltage of the drive transistor T2 is large, the voltage difference between the gate and the drain of the drive transistor T2 is also large, which causes the threshold voltage of the drive transistor T2 to drift more. Therefore, when the brightness level of the display panel is low, it is necessary to appropriately increase the bias adjustment signal V0 to quickly adjust the bias state of the drive transistor T2. In this case, the bias adjustment signal Vs1 provided in the first mode of high brightness and the bias adjustment signal Vs2 provided in the second mode of low brightness satisfy Vs1<Vs2.

Further, referring to FIG. 4 to FIG. 5, in a case where the drive transistor T2 is an N-type transistor, and when the emission brightness level of the light emitting element 20 is low, the drive current is small, the voltage of the data signal provided by the data writing module 11 is small, so that the gate voltage of the drive transistor T2 is small, the voltage difference between the gate of the drive transistor T2 and the first pole of the drive transistor T2 or between the gate of the drive transistor T2 and the second pole of the drive transistor T2 is larger, the Id-Vg curve of the drive transistor T2 is prone to drift, causing the threshold voltage drift of the drive transistor T2 to be severer, and in this case, the bias state of the drive transistor T2 can be quickly adjusted by the larger bias adjustment signal. That is, when the brightness level of the display panel is low, a larger bias adjustment signal V0 is provided to the first pole of the drive transistor T2 or the second pole of the drive transistor T2, while when the brightness level of the display panel is high, a large bias adjustment signal is provided to the first pole of the drive transistor T2 or the second pole of the drive transistor T2. That is, when the voltage of the data signal provided to the drive transistor T2 in the first mode is higher than the voltage of the data signal provided to the drive transistor T2 in the second mode, the voltage Vs1 of the bias adjustment signal in the first mode and the voltage Vs2 of the bias adjustment signal in the second mode satisfy Vs1<Vs2.

In other embodiments, for the case where the drive transistor T2 is an N-type transistor, since in a brightness level range, the brightness level of the display panel is high, the emission brightness level of the light emitting element 20 is high, and the drive current generated by the drive transistor T2 is large. In this case, the voltage difference between the source and the drain of the drive transistor T2 is large, and because the gate voltage of the drive transistor T2 is large, the voltage difference between the gate and the drain of the drive transistor T2 is also large, which causes the threshold voltage of the drive transistor T2 to drift more. Therefore, when the brightness level of the display panel is high, it is necessary to appropriately increase the bias adjustment signal V0 to quickly adjust the bias state of the drive transistor T2. For this case, the bias adjustment signal Vs1 provided in the first mode of high brightness level and the bias adjustment signal Vs2 provided in the second mode of low brightness level satisfy Vs1>Vs2.

In some embodiments, referring to FIG. 2 to FIG. 5, in the case where the initialization module 16 provides different initialization signals Vini in different modes, when the display panel works in a high brightness mode, the anode of the light emitting element 20 accumulates a large number of electric charges, and the cathode of the light emitting element 20 generally receives the fixed negative power supply signal PVEE, so that the difference between the anode of the light emitting element and the cathode of the light emitting element 20 is large; and when the display panel works in a low brightness mode, the difference between the anode of the light emitting element and the cathode of the light emitting element is small. To balance the initialization effects in different brightness modes, a lower initialization signal may be provided in a high brightness mode so that the anode of the light emitting element 20 in a high brightness mode receives a low voltage to quickly initialize the light emitting element 20 in a high brightness mode; and in a low brightness mode, the initialization signal may be relatively high. In this case, the initialization signal Vi1 provided in the first mode with high brightness level (i.e., the high brightness mode) and the initialization signal Vi2 provided in the second mode with low brightness level (i.e., the low brightness mode) may satisfy Vi1<Vi2. The initialization signal Vini is generally a negative voltage, and a height of the initialization signal Vini described herein refers to a magnitude of the voltage value of the initialization signal Vini, that is, the initialization signal Vini is more negative, the initialization signal Vini is smaller, and the initialization signal Vini is closer to 0V, the initialization signal Vini is larger.

In some embodiments, since when the display panel is in a high brightness mode, the drive current received by the light emitting element 20 is large, which enables the light emitting element 20 to quickly reach its operating voltage, that is, the light emitting element 20 can be quickly charged to a voltage at which it can start to emit light. However, when the drive current received by the light emitting element 20 is small, it takes a long time for the light emitting element 20 to reach its operating voltage. In this case, before the light emitting element 20 emits light, a small initialization signal Vini may be provided to initialize the light emitting element 20 in a case where a large drive current can be received, so that the anode voltage of the light emitting element 20 is small, and a large initialization signal Vini may be provided to initialize the light emitting element 20 in a case where a small drive current can be received, so that the anode voltage of the light emitting element 20 is large, and balancing the light emitting situations of the light emitting element 20 in a high brightness mode and in a low brightness mode. In this case, the initialization signal Vi1 provided in the first high brightness mode and the initialization signal Vi2 provided in the second low brightness mode may satisfy Vi1>Vi2.

It may be understood that the bias adjustment signal V0 provided by the bias adjustment module 14 is used to adjust the bias states of the drive transistor T2 in different brightness modes, while the initialization signal Vini provided by the initialization module 16 is used to initialize the anode of the light emitting element 20, the bias adjustment signal V0 and the initialization signal Vini have different functions. Therefore, when the display panel is shifted from a brightness mode to another brightness mode, the change amount of the bias adjustment signal V0 may be the same as or different from the change amount of the initialization signal Vini.

In some embodiments, the bias adjustment signal Vs1 and the initialization signal Vi1 in the first mode in which the display panel displays with a high brightness, and the bias adjustment signal Vs2 and the initialization signal Vi2 in the second mode in which the display panel displays with a low brightness, may satisfy $|Vs1-Vs2|\neq|Vi1-Vi2|$. As such, the bias adjustment signal provided to the first pole of the drive transistor T2 or the second pole of the drive transistor T2 may be adjusted based on the bias condition of the drive transistor T2, and the initialization signal provided to the anode of the light emitting element 20 may be adjusted based on the drift condition between the anode of the light emitting element and the cathode of the light emitting element 20 so that the provided bias adjustment signal and the provided initialization signal do not interfere with each other.

For example, providing different bias adjustment signals in different brightness modes is to adjust the bias states of the drive transistor T2 in different brightness modes, that is, to adjust a voltage difference between the gate of the drive transistor T2 and the first pole of the drive transistor T2 or between the gate of the drive transistor T2 and the second pole of the drive transistor T2, and to adjust a voltage difference between the first pole of the drive transistor T2 and the second pole of the drive transistor T2, therefore, when the display panel changes from one brightness mode to another brightness mode, if the change amount of the bias adjustment signal is large, the change amount of voltage of the first pole of the drive transistor T2 or the change amount of voltage of the second pole of the drive transistor T2 is large, so that the bias states caused by the voltage difference between the gate of the drive transistor T2 and the first pole of the drive transistor T2 or between the gate of the drive transistor T2 and the second pole of the drive transistor T2 and the voltage difference between the first pole of the drive transistor T2 and the second pole of the drive transistor T2 can be adjusted in different brightness modes, and the corresponding adjustment difference can be reflected. Providing different initialization signals Vini in different brightness modes is to balance the initialization effects of the anode of the light emitting element 20, and for which, a difference in the initialization effects can be reflected even when there is a small change in the initialization signal. Therefore, when it changes from one brightness mode to another brightness mode, the change amount $|Vs1-Vs2|$ of the bias adjustment signal and the change amount $|Vi1-Vi2|$ of the initialization signal may satisfy $|Vs1-Vs2|>|Vi1-Vi2|$.

In some embodiments of the present disclosure, when the display panel changes from one brightness mode to another brightness mode, the change amount $|Vs1-Vs2|$ of the bias adjustment signal and the change amount $|Vi1-Vi2|$ of the initialization signal may also satisfy $|Vs1-Vs2|<|Vi1-Vi2|$, which is not specifically limited in the embodiments of the present disclosure.

It should be noted that the above-mentioned structure of the pixel circuit is not the whole structure of the pixel circuit mentioned in the embodiments of the present disclosure. In an embodiment of the present disclosure, as shown in FIG. 2, the pixel circuit 10 may further include a reset module 15, and the reset module 15 is configured to provide a reset signal to the gate of the drive transistor T2 to reset the drive transistor T2. In this case, the reset module 15 may be electrically connected to the gate of the drive transistor T2.

For example, as shown in FIG. 2, one terminal of the reset module 15 receives a reset signal Vref, and the other terminal of the reset module 15 may be electrically connected to the gate of the drive transistor T2. The reset module 15 may be turned on or off under the control of a scan signal S3. When the scan signal S3 controls the reset module to be turned on, the reset module 15 can transmit the reset signal Vref to the gate of the drive transistor T2 to reset the gate of the drive transistor T2. The reset module 15 may include a reset transistor T5, a gate of the reset transistor T5 receives the scan signal S3, a first pole of the reset transistor T5 receives the reset signal Vref, and a second pole of the reset transistor T5 is electrically connected to the gate of the drive transistor T2 at the node N1.

It may be understood that the reset transistor T5 may be an N-type transistor, and the material of the active layer of the reset transistor T5 may include an oxide semiconductor, such as an indium gallium zinc oxide (IGZO). In this case, the reset transistor T5 is turned on under the control of a high level of the scan signal S3 and turned off under the control of a low level of the scan signal S3. In other embodiments, the reset transistor may also be a P-type transistor, and the material of its active layer may include a silicon-based semiconductor, such as a low temperature polysilicon (LTPS) semiconductor. In this case, the reset transistor is turned on under the control of the low level of the scan signal received by its gate and turned off under the control of the high level of the scan signal received by its gate. The type of the reset transistor is not specifically limited in the embodiments of the present disclosure.

With continued reference to FIG. 2, the pixel circuit 10 may further include a compensation module 13, and the compensation module 13 is configured to compensate the threshold voltage of the drive transistor T2 to alleviate or eliminate the effect of the threshold voltage of the drive transistor T2 on the drive current provided by the drive transistor T2. Taking a first pole of the drive transistor T2 being the source of the drive transistor T2 and the second pole of the drive transistor T2 being the drain of the drive transistor T2 as an example, the compensation module 13 may be electrically connected between the gate of the drive transistor T2 and the drain of the drive transistor T2.

For example, one terminal of the compensation module 13 may be electrically connected to the gate of the drive transistor T2 at the node N1, the other terminal of the compensation module 13 may be electrically connected to the first pole of the drive transistor T2 or the second pole of the drive transistor T2, and the compensation module 13 is electrically connected to the drain D of the drive transistor T2 at the node N3. The compensation module 13 may be turned on or off under the control of a scan signal S2, and when the compensation module 13 is controlled by the scan signal S2 to be turned on, the compensation module 13 adjusts the voltage between the gate and the drain of the drive transistor T2 and compensating the threshold voltage of the drive transistor T2. The compensation module 13 may include a compensation transistor T3, in which, a first pole of the compensation transistor T3 is electrically connected to the drain of the drive transistor T2, a second pole of the compensation transistor T3 is electrically connected to the gate of the drive transistor T2, and a gate of the compensation transistor T3 receives the scan signal S2.

It may be understood that the compensation transistor T3 may be an N-type transistor, and that the material of the active layer of the compensation transistor T3 may include an oxide semiconductor, such as an indium gallium zinc oxide semiconductor (IGZO). In this case, the compensation transistor T3 is turned on under the control of a high level of the scan signal S2 and turned off under the control of a low level of the scan signal S2. In other embodiments, the compensation transistor may also be a P-type transistor, and the material of the active layer may include a silicon-based semiconductor, such as a low temperature polysilicon (LTPS) semiconductor. In this case the compensation transistor is turned on under the control of the low level of the scan signal received by its gate and turned off under the control of the high level of the scan signal received by its gate. The type of the compensation transistor is not specifically limited in the embodiments of the present disclosure.

For example, taking each of the reset transistor and the compensation transistor being of an N-type transistor, and each of other transistors being of a P-type transistor as an example, with reference to FIG. 2 and FIG. 6, while the display panel displays an image frame, an operation process of the pixel circuit 10 may include a reset stage, a bias adjustment stage, a data writing stage, and a light-emitting stage, in which the reset stage, the bias adjustment stage, and the data writing stage are all non-light-emitting stages.

In the reset stage, the high level of the scan signal S3 controls the reset transistor T5 to be turned on and the other transistors to be turned off, and the reset signal Vref of the negative voltage is written to the gate of the drive transistor T2 through the turned-on reset transistor T5. In the bias adjustment stage, a low level of the scan signal SV controls the bias adjustment transistor T4 to be turned on and the other transistors to be turned off, and the bias adjustment signal V0 is written to the drain of the drive transistor T2 through the turned-on bias adjustment transistor T4 to allow the gate voltage of the drive transistor T2 to be lower than the drain voltage thereof, and drifting the gate voltage and the drain voltage of the drive transistor T2. In the data writing stage, a low level of the scan signal S1 controls the data writing transistor T1 to be turned on, and the high level of the scan signal S2 controls the compensation transistor T3 to be turned on and other transistors to be turned off, to allow the data signal Vdata to be written into the gate of the drive transistor T2 through the data writing transistor T1, the drive transistor T2 and the compensation transistor T3 in sequence, and compensate the threshold voltage Vth of the drive transistor T2 to the gate thereof, so that the gate voltage Vg of the drive transistor T2 can reach Vdata+Vth. In the light-emitting stage, the low level of the light emitting control signal EM controls the first light emitting control transistor T7 and the second light emitting control transistor T8 to be turned on and the other transistors to be turned off so that the drive transistor T2 provides a drive current according to the gate thereof, and the drive current is $I=k(PVDD-Vdata)^2$, with no relation to the threshold voltage of the drive transistor T2, and in this case, the light emitting element 20 is driven by the drive current I to emit light.

In addition, the non-light-emitting stage in one image frame of the display panel may further include an initialization stage. In the initialization stage, a high level of the scan signal S4 controls the initialization transistor T6 to be turned on so that the initialization signal Vini is transmitted to the anode of the light emitting element 20 to reset the anode of the light emitting element 20. In order to reduce the duration of the light-emitting stage, the initialization stage may coexist with other non-light-emitting stages, for example, with the bias adjustment stage. In this case, if the initialization transistor T6 and the bias adjustment transistor T4 are the same type of transistors, the scan signal SV for controlling the bias adjustment transistor T4 to be turned on or to be turned off may also serve as the scan signal S4 for controlling the initialization transistor to be turned on or to be turned off. In other embodiments, the initialization stage may coexist with the reset stage or the data writing stage, which is not specifically limited in the embodiments of the present disclosure.

It should be noted that FIG. 6 is only an exemplary drawing of embodiments of the present disclosure, and FIG. 6 only shows the case where the reset stage is located before the bias adjustment stage for example, while in embodiments of the present disclosure the reset stage may also be located during a duration of the bias adjustment stage.

Figure 8:
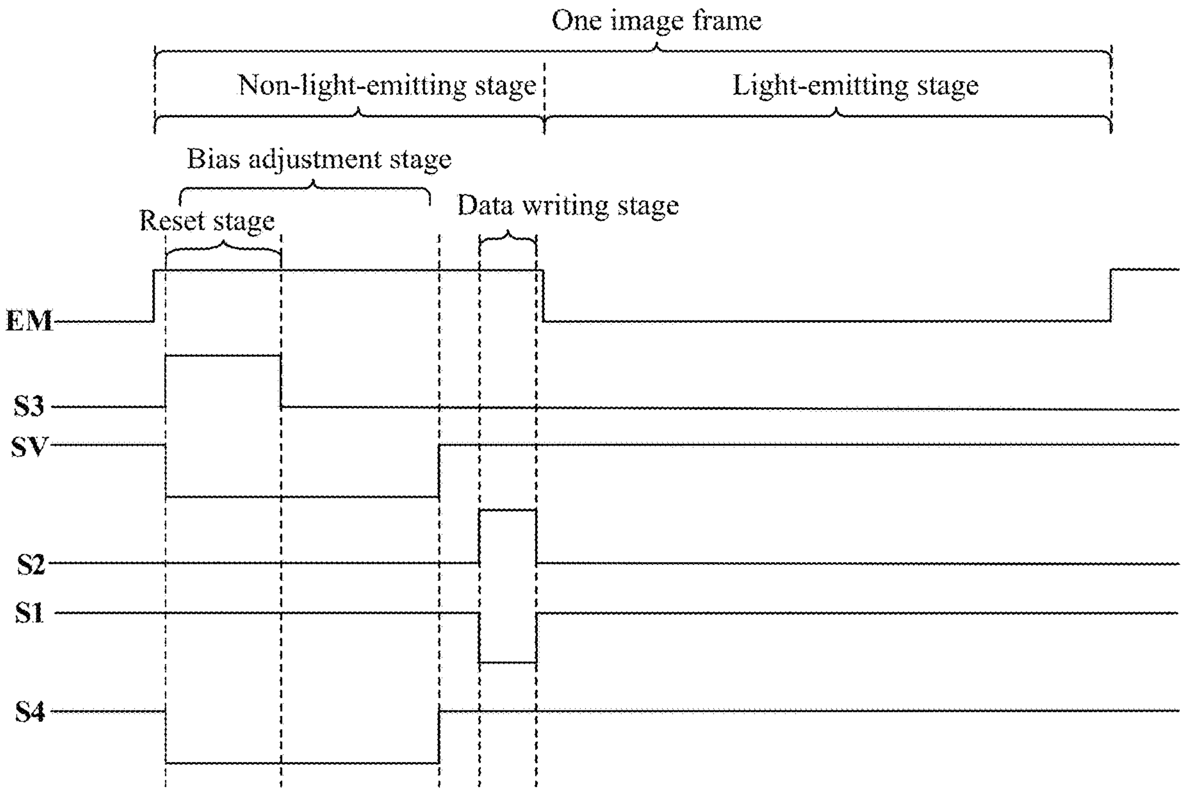
FIG. 8 is another driving timing diagram of the pixel circuit corresponding to FIG. 2.

It is taken as an example that the reset transistor and the compensation transistor are each of N-type transistor and the other transistors are each of P-type transistor, FIG. 8 is another driving timing diagram of the pixel circuit corresponding to FIG. 2. With reference to FIG. 8 and FIG. 2, the reset transistor T5 and the bias adjustment transistor T4 are both turned on in at least a part or all of the period of the bias adjustment stage, so that the drain potential of the drive transistor T2 is adjusted with the bias adjustment signal V0 while the reset signal Vref resets the drive transistor T2, and the gate voltage and the drain voltage of the drive transistor T2 are adjusted at the same time, which facilitates improvement of the bias effect, and may also reduce the duration of the non-light-emitting stage of one image frame, increasing the refresh frequency.

Figure 9:
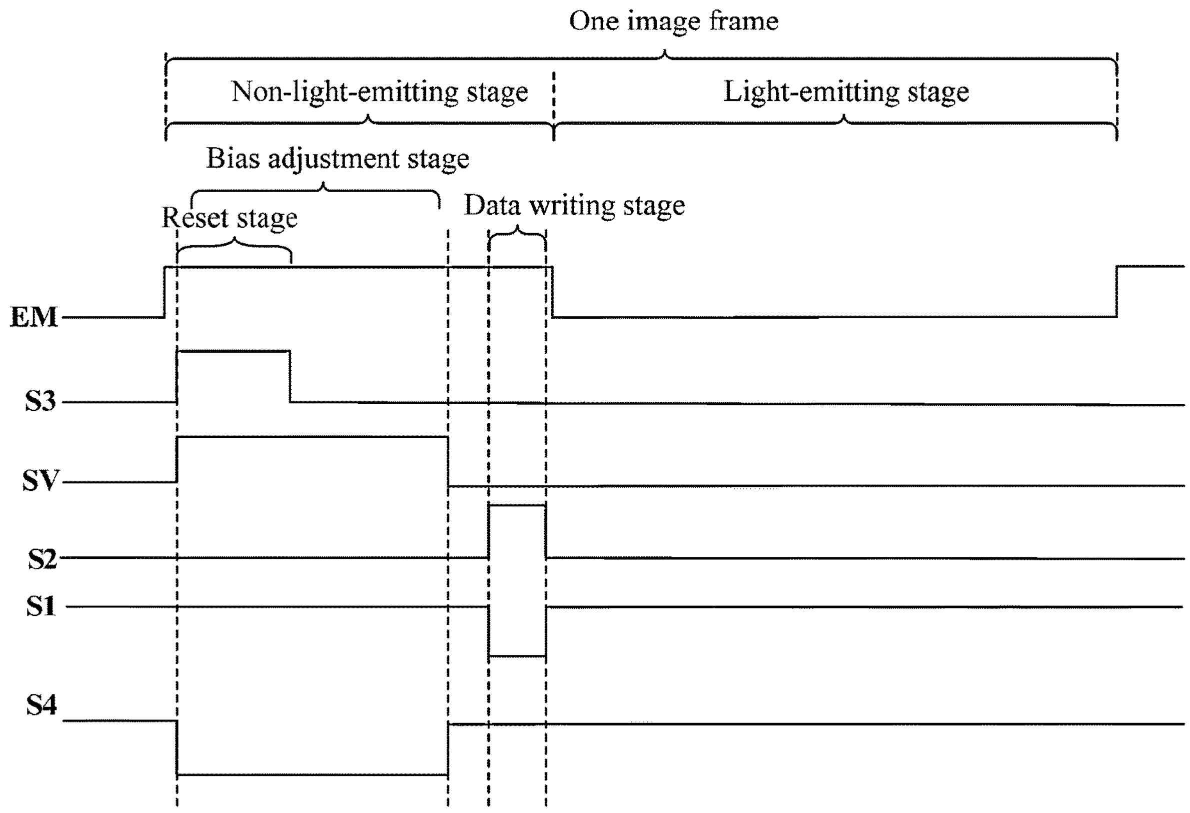
FIG. 9 is a driving timing diagram of the pixel circuit corresponding to FIG. 4.

In some embodiments of the present disclosure, as shown in FIG. 4, the bias adjustment transistor T4 and the drive transistor T2 may also be N-type transistors. In this case, FIG. 9 is a drive timing diagram of the pixel circuit corresponding to FIG. 4. With reference to FIGS. 4 and FIG. 9, in an overlapping period of the reset stage and the bias adjustment stage, the high level of the scan signal S3 controls the reset transistor T5 to be turned on and a high level of the scan signal SV controls the bias adjustment transistor T4 to be turned on, and other transistors are turned off, and the reset signal Vref of positive voltage is written into the gate of the drive transistor T2 through the turned-on reset transistor T5; and at the same time, the bias adjustment signal V0 is written into the drain of the drive transistor T2 through the turned-on bias adjustment transistor T4. In this case, the gate voltage of the drive transistor T2 is higher than the drain voltage of the drive transistor T2, and biasing the gate voltage and the drain voltage of the drive transistor T2 is achieved. In other embodiments, the reset stage and the bias adjustment stage may also not overlap each other.

Figure 10:
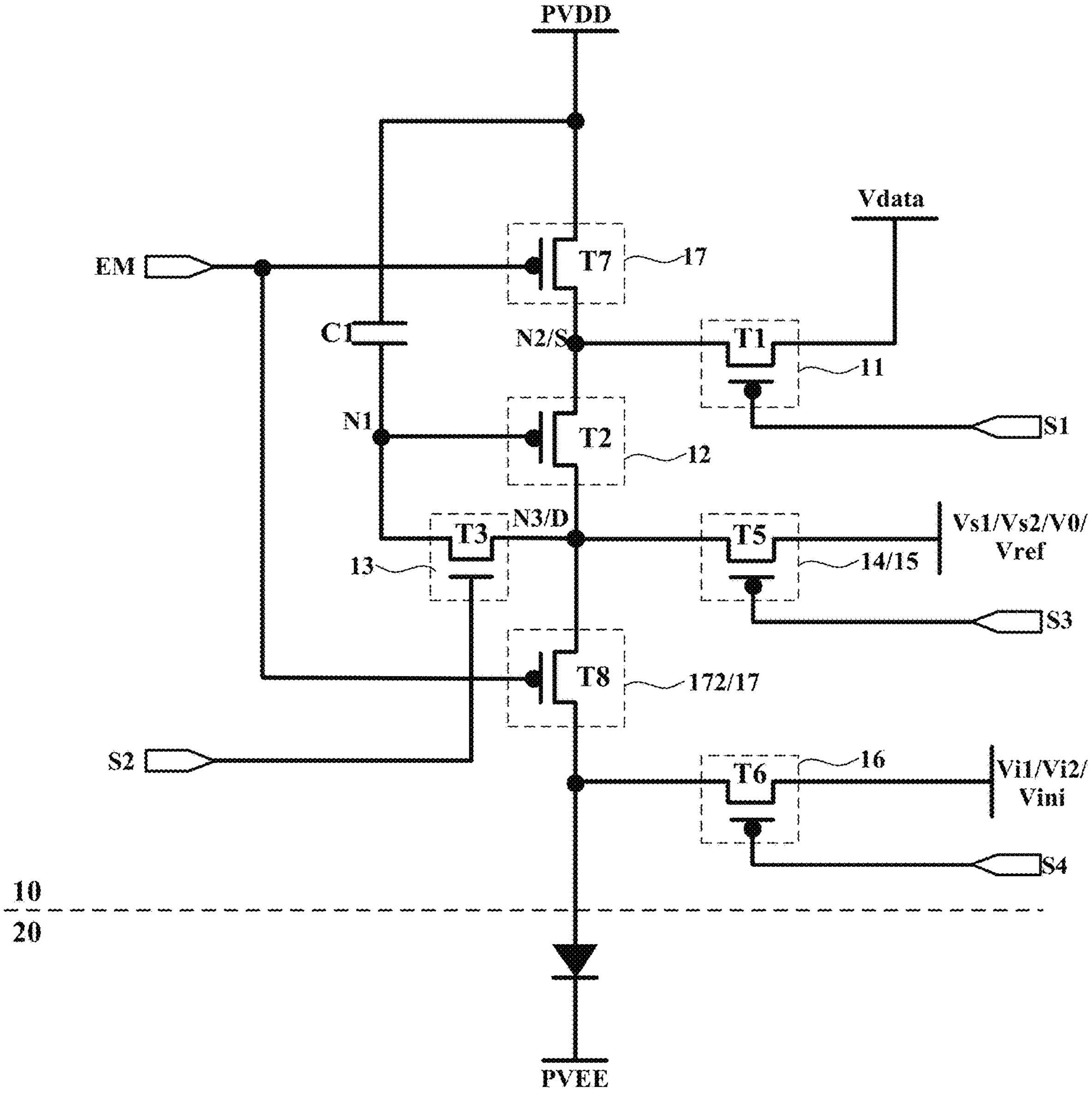
FIG. 10 is a schematic structural diagram of still another pixel circuit according to an embodiment of the present disclosure.

In some embodiments, FIG. 10 is a schematic structural diagram of still another pixel circuit according to an embodiment of the present disclosure. As shown in FIG. 10, in a case where the pixel circuit 10 includes the reset module 15 and the compensation module 13, the compensation module 13 is connected between the gate of the drive transistor T2 and the second pole of the drive transistor T2, and the reset module 15 may also be connected to the first pole of the drive transistor T2 or the second pole of the drive transistor T2. In this case, the reset module 15 may also serve as the bias adjustment module 14. In the reset stage, the reset module 15 provides a reset signal Vref to the gate of the drive transistor T2; and in the bias adjustment stage, the reset module 15 provides a bias adjustment signal V0 to the first pole of the drive transistor T2 or the second pole of the drive transistor T2.

For example, in a case where the drive transistor T2 is a P-type transistor, the first pole of the drive transistors T2 is the source thereof, and the second pole of the drive transistors T2 is the drain thereof. In this case, one terminal of the reset module 15 receives the reset signal Vref or the bias adjustment signal V0, and the other terminal of the reset module 15 is electrically connected to the drain of the drive transistor T2; one terminal of the compensation module 13 is electrically connected to the drain of the drive transistor T2, and the other terminal of the compensation module 13 is electrically connected to the gate of the drive transistor T2. In the reset stage, the reset module 15 and the compensation module 13 are both turned on, and the reset signal Vref is transmitted to the drain of the drive transistor T2 through the reset module 15 and transmitted from the drain of the drive transistor T2 to the gate of the drive transistor T2 through the compensation module 13 to reset the gate of the drive transistor T2. However, in the bias adjustment stage, only the reset module 15 is turned on so that the bias adjustment signal V0 is transmitted to the drain of the drive transistor T2 to adjust the voltage difference between the gate of the drive transistor T2 and the drain thereof, and to adjust the voltage difference between the source of the drive transistor T2 and the drain thereof.

The reset module 15 may include a reset transistor T5, the compensation module 13 may include a compensation transistor, and the reset transistor T5 also serves as a bias adjustment transistor. A first pole of the reset transistor 15 receives a reset signal Vref or a bias adjustment signal V0, a second pole of the reset transistor T5 is electrically connected to a drain of the drive transistor T2, and a gate of the reset transistor T5 receives the scan signal S3. The first pole of the compensation transistor T3 is electrically connected to the drain of the drive transistor T2, the second pole of the compensation transistor T3 is electrically connected to the gate of the drive transistor T2, and the gate of the compensation transistor T3 receives the scan signal S2. In this case, the scan signal S3 can control the reset transistor T5 to be turned on or off, and the scan signal S2 can control the compensation transistor T3 to be turned on or off. The type of the compensation transistor T3 and the type of the reset transistor T5 may be the same or different, which is not specifically limited in the embodiments of the present disclosure.

Figure 11:
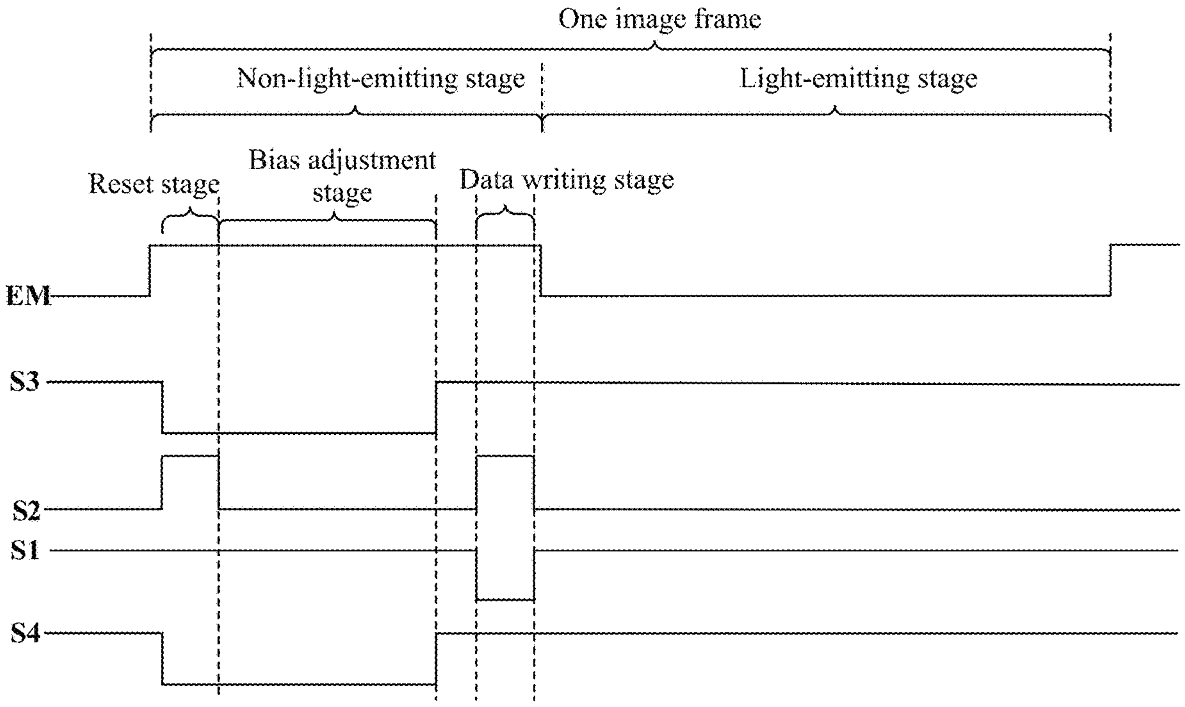
FIG. 11 is a driving timing diagram of the pixel circuit corresponding to FIG. 10.

For example, the case where the reset transistor T5 and the compensation transistor T3 are of different types, and the reset transistor T5 is a P-type transistor and the compensation transistor T3 is an N-type transistor is taken as an example FIG. 11 is a driving timing diagram of the pixel circuit corresponding to FIG. 10, and with reference to FIG. 11 and FIG. 10, in the reset stage, the low level of the scan signal S3 controls the reset transistor T5 to be turned on, and the high level of the scan signal S2 controls the compensation transistor T3 to be turned on, and the reset signal Vref received by the first pole of the reset transistor T5 is transmitted to the gate of the drive transistor T2 sequentially through the reset transistor T5 and the compensation transistor T3. In the bias adjustment stage, the low level of the scan signal S3 controls the reset transistor T5 to remain the turning-on state, and the low level of the scan signal S2 controls the compensation transistor T3 to be turned off, and the bias adjustment signal V0 received by the first pole of the reset transistor T5 is transmitted to the drain of the drive transistor T2 through the reset transistor T5. Other stages are similar to the process in which the reset transistor T5 does not serve as the bias adjustment transistor. Reference may be made to the above description for details, which are not repeated herein.

Figure 12:
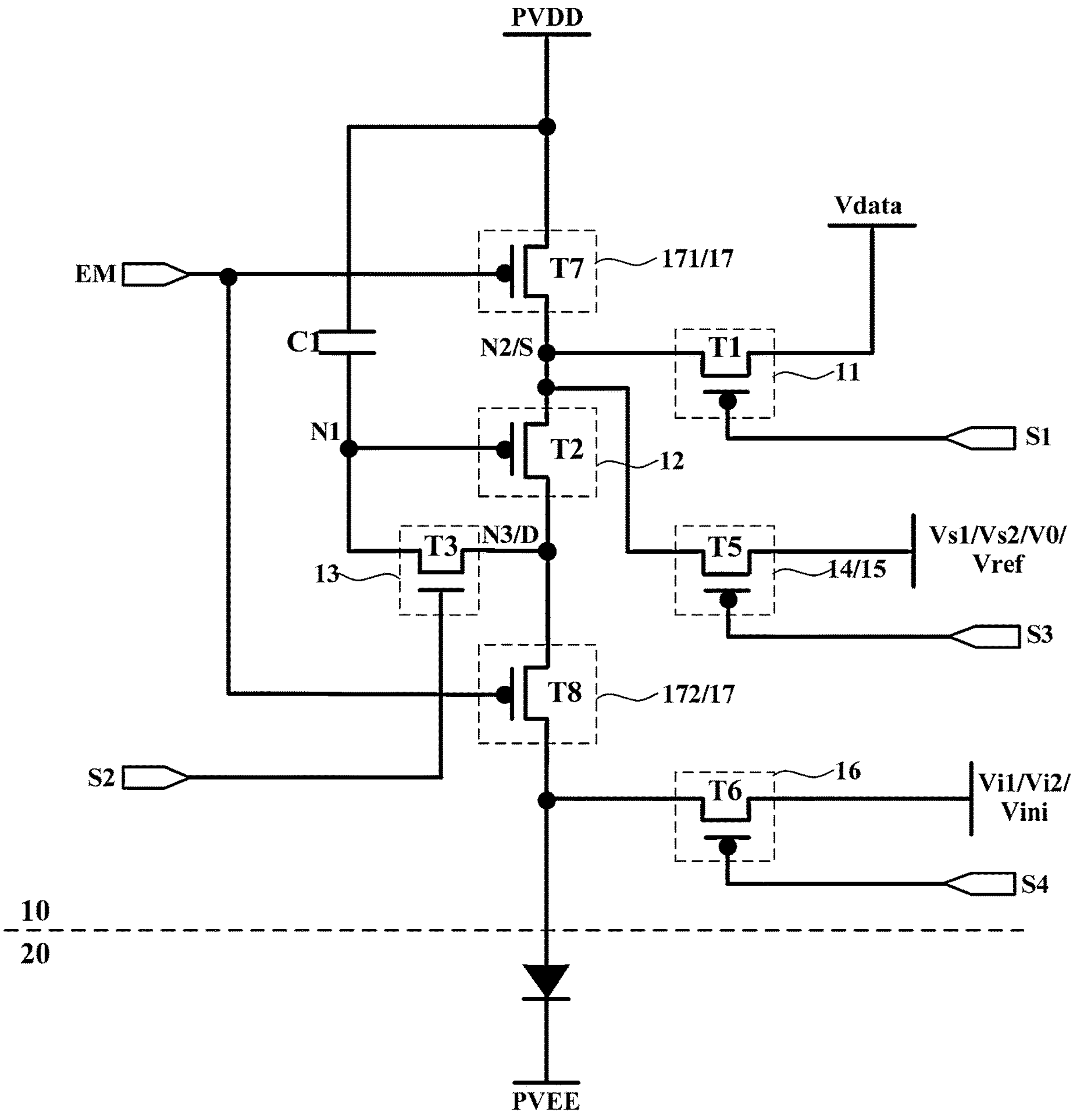
FIG. 12 is a schematic structural diagram of still another pixel circuit according to an embodiment of the present disclosure.

It is to be noted that, FIG. 10 only exemplarily shows the case where the reset module 15 is electrically connected to the second pole of the drive transistor T2. In an embodiment of the present disclosure, as shown in FIG. 12, the reset module 15 may also be electrically connected to the source of the drive transistor T2. In this case, in the reset stage, the reset signal Vref is transmitted to the source of the drive transistor T2 through the reset module 15, to reset the source of the drive transistor T2, and the reset signal Vref will also be transmitted to the drain of the drive transistor T2 through the drive transistor T2 to reset the drain of the drive transistor T2, and then is transmitted from the drain of the drive transistor T2 to the gate of the drive transistor T2 through the compensation module 13 to reset the gate of the drive transistor T2. The reset process of the reset stage is not specifically limited in the embodiments of the present disclosure.

Figure 13:
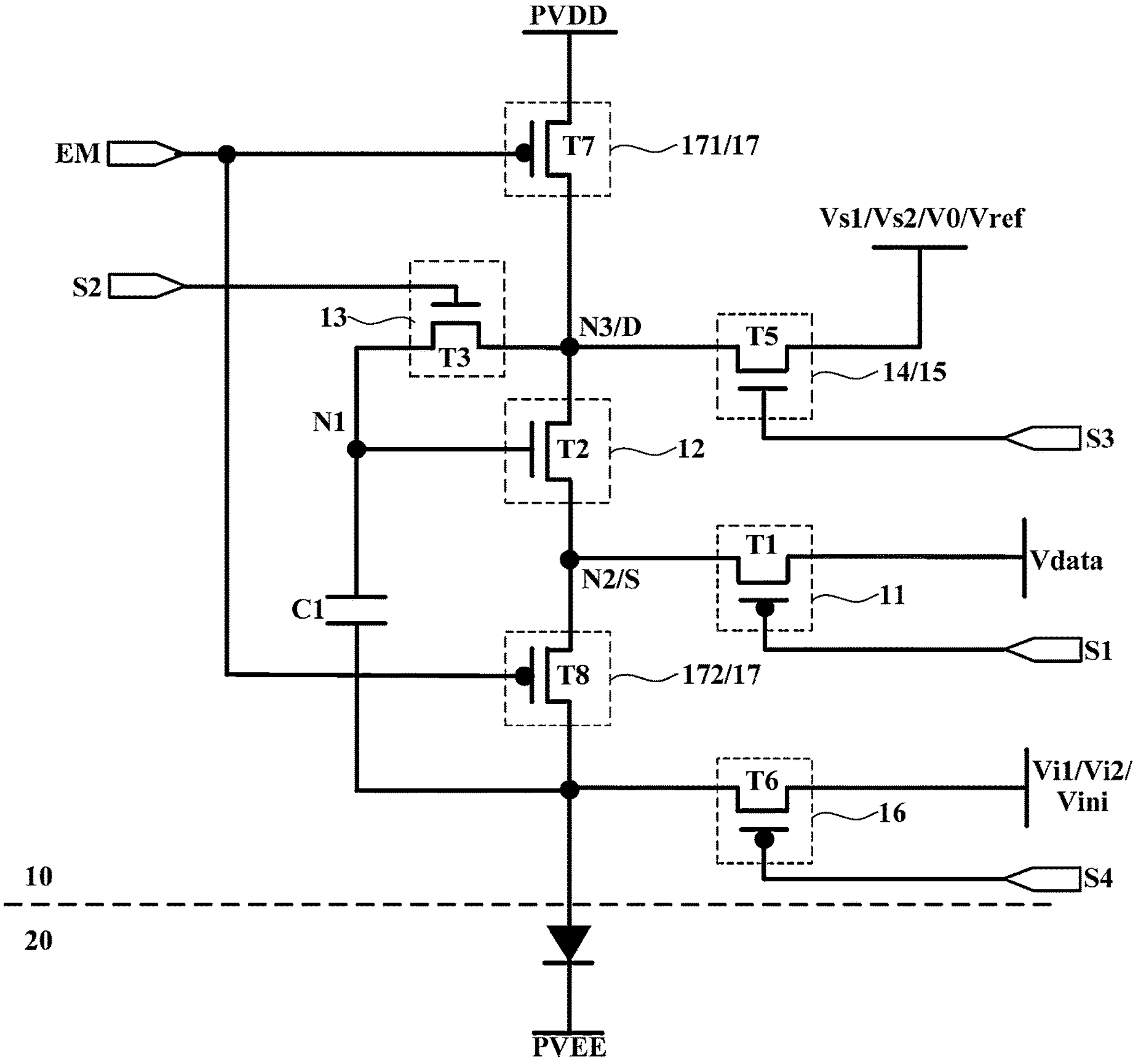
FIG. 13 is a schematic structural diagram of still another pixel circuit according to an embodiment of the present disclosure.
Figure 14:
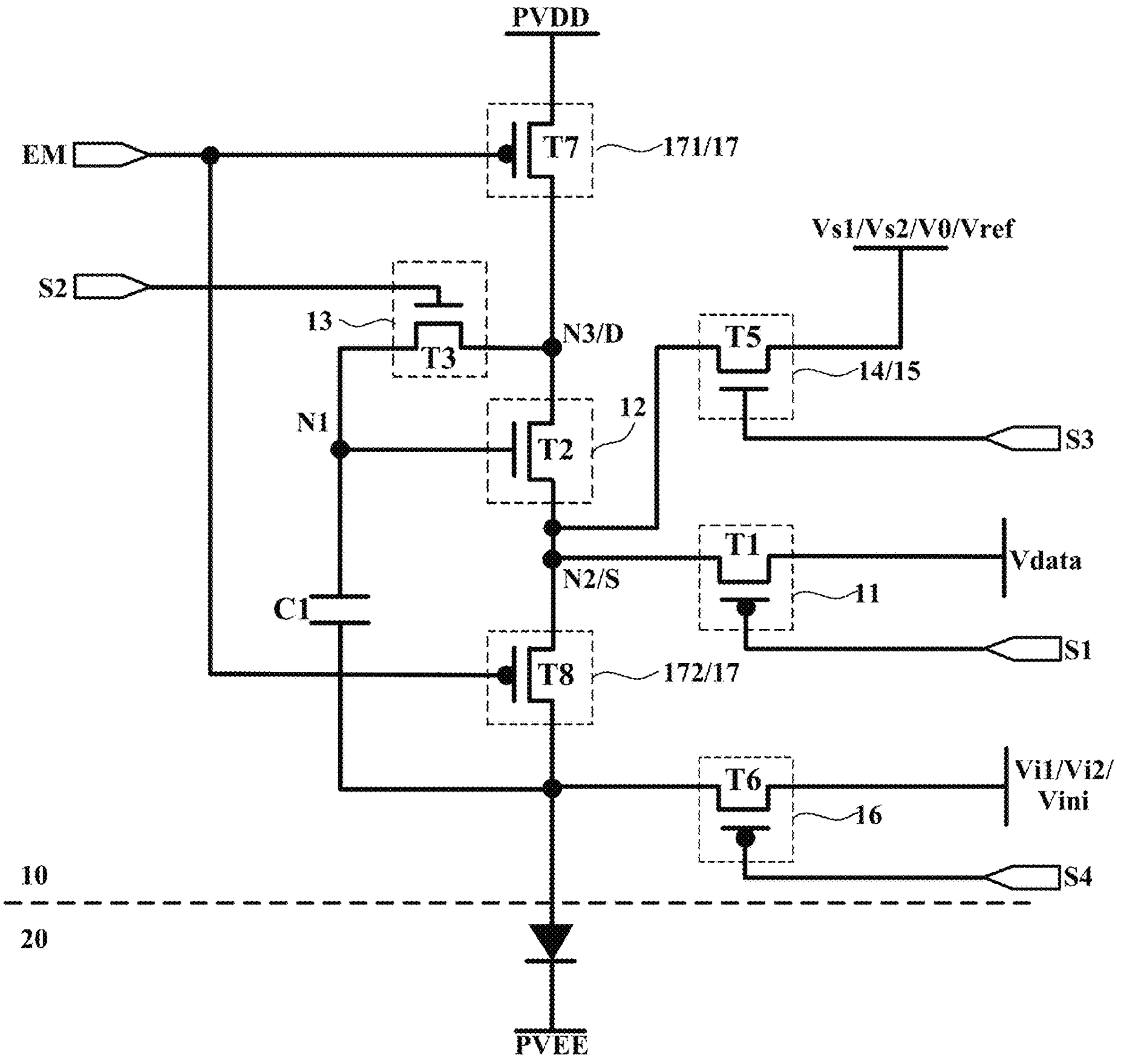
FIG. 14 is a schematic structural diagram of still another pixel circuit according to an embodiment of the present disclosure.

It may be understood that the drive transistor T2 may also be an N-type transistor, and in this case, the first pole of the drive transistor T2 is its drain and the second pole of the drive transistor T2 is its source. As shown in FIG. 13, the difference of the case of the drive transistor T2 being of an N-type transistor from the case of the drive transistor T2 being of a P-type transistor lies in that the compensation module 13 is electrically connected between the first pole of the drive transistor T2 and the gate of the drive transistor T2, the data writing module 11 is electrically connected to the second pole of the drive transistor T2, and the reset module 15 is electrically connected to the first pole of the drive transistor T2. In other embodiments, as shown in FIG. 14, the compensation module 13 is electrically connected between the first pole of the drive transistor T2 and the gate of the drive transistor T2, and the data writing module 11 and the reset module 15 are both electrically connected to the second pole of the drive transistor T2. Any arrangement in FIG. 10, FIG. 12, FIG. 13 and FIG. 14, with the reset module 15 also serving as the bias adjustment module 14, facilitates simplification of the configuration of the pixel circuit 10, reduction of the size of the pixel circuit 10, and improvement of the resolution of the display panel on the premise that the bias adjustment function can be realized.

In some embodiments, an operation process of the pixel circuit includes a data writing frame and a holding frame. The data writing frame in the first mode corresponds to a bias adjustment signal of Vs11, and the holding frame in the first mode corresponds to a bias adjustment signal of Vs12. The data writing frame in the second mode corresponds to a bias adjustment signal of Vs21, and the holding frame in the second mode corresponds to a bias adjustment signal of Vs22; where |Vs11−Vs12|=|Vs21−Vs22|.

Taking the pixel circuit shown in FIG. 10 as an example, as shown in FIG. 10, the frame is calculated by a minimum period of one light-emitting stage, the frame may include a data writing frame and a holding frame, and the data signal Vdata is provided to the drive transistor T2 in the data writing frame, and the data signal Vdata is no longer provided to the drive transistor T2 in the holding frame. In this way, the emission brightness level of the light emitting element in the holding frame may be consistent with the emission brightness level of the light emitting element in the data writing frame. In this case, the pixel circuit 10 should further include a storage capacitor C1, and the storage capacitor C1 is electrically connected between the positive power supply signal PVDD and the gate of the drive transistor T2 to store the gate voltage of the drive transistor T2, ensuring accuracy of the gate voltage of the drive transistor T2.

It may be understood that the above-mentioned concepts of the data writing frame and the holding frame are different from the concept of data refresh frequency of the display panel. In the concept of data refresh frequency, the data refresh is calculated by a minimum period of writing the data signal, and one data refresh period may include one data writing frame and several holding frames.

Figure 15:
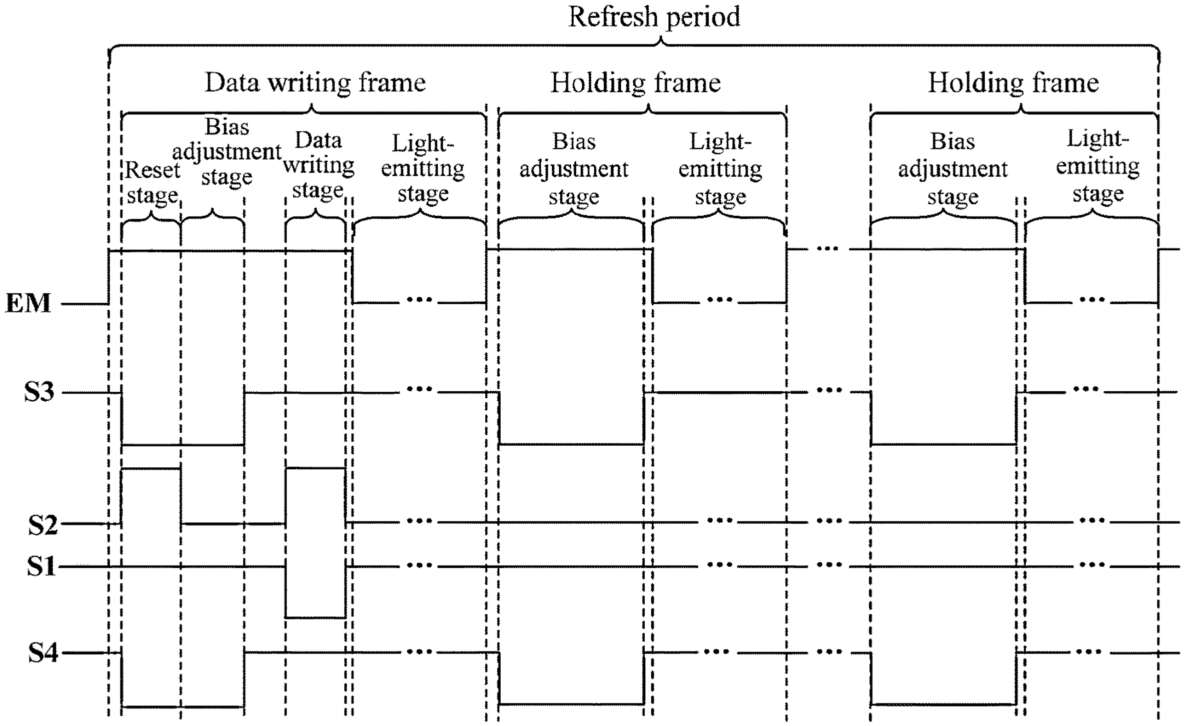
FIG. 15 is a timing diagram of operation process of a pixel circuit according to an embodiment of the present disclosure.

For example. FIG. 15 is a timing diagram of operation process of a pixel circuit according to an embodiment of the present disclosure. With reference to FIG. 10 and FIG. 15, a data writing frame may include the reset stage, the bias adjustment stage, the data writing stage, and the light-emitting stage. However, the holding frame may only include the bias adjustment stage, the initialization stage, and the light-emitting stage. Since in different modes, the brightness levels of the display panel are different, the data signals provided to the drive transistor T2 are different, therefore the bias states of the drive transistor T2 can be adjusted correspondingly by using different bias adjustment signals. However, in one data refresh period in a same mode, the data signal may not be provided to the drive transistor T2 in a holding frame, so that the drive transistor T2 holds the data signal written in the data writing frame, and the bias state of the drive transistor T2 in the holding frame may be the same as the bias state of the drive transistor T2 in the data writing frame, and in this case, the bias adjustment signal provided in the data writing frame may be the same as the bias adjustment signal provided in the holding frame in this mode, so that the difference between the bias adjustment signal Vs11 (Vs21) provided in the data writing frame and the bias adjustment signal Vs12 (Vs22) provided in the holding frame in the same mode is zero, i.e., |Vs11−Vs12|=|Vs21−Vs22|=0.

In some cases, the gate voltage of the drive transistor T2 is continuously discharged over time so that the gate voltage of the drive transistor T2 in the data writing frame is different from the gate voltage of the drive transistor T2 in the holding frame. In this case, different bias adjustment signals V0 may be respectively provided according to requirements to respectively adjust the bias state of the drive transistor T2 in the data writing frame and the bias state of the drive transistor T2 in the holding frame, that is, the bias adjustment signal Vs11 (Vs21) provided in the data writing frame is different from the bias adjustment signal Vs12 (Vs22) provided in the holding frame in a same mode, that is, both |Vs11−Vs12| and |Vs21−Vs22| are not zero. However, the charging and discharging conditions of the drive transistor T2 in different modes are similar, therefore, the change amount between the bias adjustment signal Vs11 (Vs21) provided in the data writing frame and the bias adjustment signal Vs12 (Vs22) provided in the holding frame may be the same in different modes, that is, |Vs11−Vs12|=|Vs21−Vs22|≠0.

Further, since in one refresh period, the holding frame is longer than the data writing frame, which leads to a small difference between the threshold voltage drifts of the drive transistor T2 in the data writing frame in different modes, and leads to a large difference between the threshold voltage drifts of the drive transistor T2 in the holding frame in different modes, the bias adjustment signals provided in the data writing frame in different modes may be the same, and the bias adjustment signals provided in the holding frame in different modes may be different, which makes the amounts of change, in different modes, between the bias adjustment signals provided in the data writing frame and the bias adjustment signal provided in the holding frame different, i.e., |Vs11−Vs21|≠|Vs21−Vs22|.

In some embodiments, the data writing frame in the first mode corresponds to a bias adjustment signal of Vs11, and the holding frame in the first mode corresponds to a bias adjustment signal of Vs12. the data writing frame in the second mode corresponds to a bias adjustment signal of Vs21, and the holding frame in the second mode corresponds to a bias adjustment signal of Vs22; and Vs11, Vs12, Vs21, and Vs22 satisfy |Vs11−Vs12|<|Vs21−Vs22|, or |Vs11−Vs12|>|Vs21−Vs22|.

In some embodiments, in a first mode in which the display panel displays with a low brightness, the duration of the holding frame is generally relatively short, so that the difference |Vs11−Vs12| between the bias adjustment signal provided in the data writing frame and the bias adjustment signal provided in the holding frame is small. In the second mode in which the display panel displays with a high brightness, the duration of the holding frame is relatively long, so that the difference |Vs21−Vs22| between the bias adjustment signal provided in the data writing frame and the bias adjustment signal provided in the holding frame is relatively large, i.e., |Vs11−Vs12|<|Vs21−Vs22|.

It is to be noted that, the above-described is only one implementation of the embodiments of the present disclosure, the bias adjustment signal provided may take into account other controllable or uncontrollable factors in addition to the above-described cases, and therefore the difference between the bias adjustment signal of the data writing frame and the bias adjustment signal of the holding frame may also satisfy |Vs11−Vs12|>|Vs21−Vs22|.

In some embodiments, in a case where an operation process of the pixel circuit includes a data writing frame and a holding frame, the data writing frame in the first mode corresponds to an initialization signal of Vi11, and the holding frame in the first mode corresponds to an initialization signal of Vi12; the data writing frame in the second mode corresponds to a bias adjustment signal of Vs21, and the holding frame in the second mode corresponds to a bias adjustment signal of Vs22; where |Vi11−Vi12|=|Vs21−Vs22|.

For example, the pixel circuit shown in FIG. 10 is continued taken as an example, with reference to FIG. 10 and FIG. 15, in one data refresh period in the same mode, the data signal is not provided to the drive transistor T2 in the holding frame, so that the drive current provided by the drive transistor T2 to the light emitting element 20 in the holding frame is held in consistence with the drive current provided by the drive transistor T2 to the light emitting element 20 in the data writing frame, so that the anode voltage of the light emitting element 20 in the holding frame may be the same as the anode voltage of the light emitting element 20 in the data writing frame, and in this case, the initialization signal provided in the data writing frame may be the same as the initialization signal provided in the holding frame in this mode, so that the difference between the initialization signal Vi11 (Vi21) provided in the data writing frame and the initialization signal Vi12 (Vi22) provided in the holding frame in the same mode is zero, that is, |Vi11−Vi12|=|Vi21−Vi22|=0.

In some cases, the anode voltage of light-emitting element 20 will change correspondingly over time and the anode voltage of the light-emitting element 20 in the data writing frame is different from the anode voltage of the light-emitting element 20 in the holding frame. In this case, different initialization signals Vini may be respectively provided according to requirements to respectively initialize the light emitting element 20 in the data writing frame and the light emitting element 20 in the holding frame, to balance the initialization effects in the data writing frame and in the holding frame, that is, the initialization signal Vi11 (Vi21) provided in the data writing frame is different from the initialization signal Vi12 (Vi22) provided in the corresponding holding frame in the same mode, that is, both |Vi11−Vi12| and |Vi21−Vi22| are not zero. However, the anode voltage changes of light-emitting element 20 in different modes are similar, therefore, the change amounts between the initialization signal Vi11 (Vi21) provided in the data writing frame in one mode and the initialization signal Vi12 (Vi22) provided in the holding frame in the respective mode may be the same from one mode to another mode, that is, |Vi11−Vi12|=|Vi21−Vi22|≠0.

Further, since in one refresh period, the holding frame is longer than the data writing frame, the difference between the anode voltage changes of the light emitting element 20 in the data writing frame in different modes is small, and the difference between the anode voltage changes of the light emitting element 20 in the holding frame in different modes is large, thus the initialization signals provided in the data writing frame in different modes may be the same. However, the initialization signals provided in the holding frame in different modes may be different, which makes the amounts of changes between the initialization signal provided in the data writing frame and the initialization signal provided in the holding frame are different in different modes, i.e., |Vi11−Vi12|≠|Vi21−Vi22|.

In some embodiments, the data writing frame in the first mode corresponds to an initialization signal of Vi11, and the holding frame in the first mode corresponds to an initialization signal of Vi12. The data writing frame in the second mode corresponds to a bias adjustment signal of Vs21, and the holding frame in the second mode corresponds to a bias adjustment signal of Vs22; where |Vi11−Vi12|>|Vs21−Vs22|, or |Vi11−Vi12|<|Vs21−Vs22|.

In some embodiments, in a first mode in which the display panel displays with a low brightness, the duration of the holding frame is generally relatively short, and the difference between the initialization signal provided in the data writing frame and the initialization signal provided in the holding frame is small. In the second mode in which the display panel displays with a high brightness, the duration of the holding frame is relatively long, and the difference between the initialization signal provided in the data writing frame and the initialization signal provided in the holding frame is relatively large, i.e., |Vi11−Vi12|<|Vi21−Vi22|.

It is to be noted that the above-described is only one implementation of an embodiment of the present disclosure, the initialization signal provided may take into account other controllable or uncontrollable factors in addition to the above-described cases. Therefore, the difference between the initialization signal of the data writing frame and the initialization signal of the holding frame may also be |Vi11−Vi12|>|Vi21−Vi22|.

In some embodiments, the data refresh frequencies of the display panel includes a first data refresh frequency F1 and a second data refresh frequency F2, satisfying F1>F2. The bias adjustment signal Vf1 at the first data refresh frequency F1, and the bias adjustment signal Vf2 at the second data refresh frequency F2 satisfy Vf1≠Vf2.

In some embodiments, the data refresh frequency of the display panel refers to a number of update times of the data signal written into the pixel circuit per unit time, which is calculated based on a minimum period of writing the data signal. Typically, the refresh frequency is lower, the data refresh period is longer. One data writing frame and multiple holding frames may be included in one data refresh period, and a duration of one data writing frame is generally fixed, therefore when the data refresh period is longer, the total duration of the holding frames is longer. In this case, different data refresh frequencies correspond to difference durations of holding frames, which causes the bias states of the drive transistor of the pixel circuit to be different at different data refresh frequencies. In this way, different bias adjustment signals may be provided to the first pole of the drive transistors or the second pole of the drive transistors of the respective pixel circuits for different data refresh frequencies to adaptively adjust the bias states of the drive transistors at different data refresh frequencies.

In some embodiments, the data refresh frequency is lower, the total duration of the holding frames is longer, causing that the threshold voltage drift of the drive transistor in the pixel circuit to be severer, and accordingly, a larger bias adjustment signal can be provided to quickly adjust the bias state of the drive transistor to enable the bias state of the drive transistor to reach a desired state quickly and accurately. In this case, the bias adjustment signal Vf1 provided at the first data refresh frequency F1 and the bias adjustment signal Vf2 provided at the second data refresh frequency F2 may satisfy Vf1<Vf2.

It is to be noted that, the above-described is only one implementation of an embodiment of the present disclosure, the provided bias adjustment signal may consider other controllable or uncontrollable factors in addition to the above-described cases. Therefore, the bias adjustment signal Vf1 provided at the first data refresh frequency F1 and the bias adjustment signal Vf2 provided at the second data refresh frequency F2 may also satisfy Vf1>Vf2.

In some embodiments, in a case where the operation process of the pixel circuit includes a data writing frame and a holding frame, the bias adjustment signal is Vf11 in the data writing frame at the first data refresh frequency F1, and is Vf12 in the data writing frame at the second data refresh frequency F2; the bias adjustment signal is Vf21 in the holding frame at the first data refresh frequency F1, and is Vf22 in the holding frame at the second data refresh frequency F2; and Vf11, Vf12, Vf21, and Vf22 satisfy $|Vf11-Vf12|=|Vf21-Vf22|$.

For example, the pixel circuit shown in FIG. 10 is continued taken as an example, with reference to FIG. 10 and FIG. 15, in one data refresh period, in the holding frame, the data signal is not provided to the drive transistor T2, so that the data signal written in the data writing frame is held by the drive transistor T2, and the bias state of the drive transistor T2 in the holding frame may be the same as the bias state of the drive transistor T2 in the data writing frame, and in this case, at the same refresh frequency, the bias adjustment signal provided to the drive transistor T2 in the data writing frame may be the same as the bias adjustment signal provided to the drive transistor T2 in the holding frame. In this case, although the bias adjustment signals provided at different data refresh frequencies are different, the change amount between the bias adjustment signals provided in the data writing frames at different refresh frequencies may be the same as the change amount between the bias adjustment signals provided in the holding frames at different refresh frequencies, that is, $|Vf11-Vf12|=|Vf21-Vf22|$.

Further, in one refresh period, the duration of the total holding frame is longer than the duration of the data writing frame, causing a small difference between the threshold voltage drifts of the drive transistor T2 in the data writing frames at different data refresh frequencies, and a large difference between the threshold voltage drifts of the drive transistor T2 in the holding frames at different data refresh frequencies, therefore, the bias adjustment signals provided in the data writing frames at different data refresh frequencies may have a small difference, and the bias adjustment signals provided in the holding frame at different data refresh frequencies may have a large difference, which causes a difference between the change amount in the bias adjustment signal provided in the data writing frames at different data refresh frequencies and the change amount in the bias adjustment signal provided in the holding frame at different data refresh frequencies, i.e., $|Vf11-Vf12|\neq|Vf21-Vf22|$.

In some embodiments, the bias adjustment signal is Vf11 in the data writing frame at the first data refresh frequency F1, and the bias adjustment signal is Vf12 in the data writing frame at the second data refresh frequency F2; the bias adjustment signal is Vf21 in the holding frame at the first data refresh frequency F1, and the bias adjustment signal is Vf22 in the holding frame at the second data refresh frequency F2; and Vf11, Vf12, Vf21, and Vf22 satisfy $|Vf11-Vf12|>|Vf21-Vf22|$, or $|Vf11-Vf12|<|Vf21-Vf22|$.

In some embodiments, at the first data refresh frequency F1, the duration of the holding frame is generally relatively short, so that the difference between the bias adjustment signal provided in the data writing frame and the bias adjustment signal provided in the holding frame is small; at the second data refresh frequency F2, the duration of the holding frame is relatively long, so that the difference between the bias adjustment signal provided in the data writing frame and the bias adjustment signal provided in the holding frame is relatively large. As a result, the difference between the bias adjustment signal Vf11 provided in the data writing frame at the first refresh frequency F1 and the bias adjustment signal Vf12 provided in the data writing frame at the second data refresh frequency F2 is small, and the difference between the bias adjustment signal Vf21 provided in the holding frame at the first refresh frequency F1 and the bias adjustment signal Vf22 provided in the holding frame at the second data refresh frequency F2 may be large, i.e., $|Vf11-Vf12|<|Vf21-Vf22|$.

It should be noted that, the above-described is only one implementation of an embodiment of the present disclosure, the bias adjustment signal provided may take into account other controllable or uncontrollable factors in addition to the above-described cases, and therefore, at different refresh frequencies, the difference between the bias adjustment signal in the data writing frame and the bias adjustment signal in the holding frame may also satisfy $|Vf11-Vf12|>|Vf21-Vf22|$.

In some embodiments, in a case where data refresh frequencies of the display panel include a first data refresh frequency band and a second data refresh frequency band, and a frequency within the first data refresh frequency band is greater than a frequency within the second data refresh frequency band, a bias adjustment signal within the first data refresh frequency band is greater than a bias adjustment signal within the second data refresh frequency band.

In some embodiments, at different data refresh frequencies, different bias adjustment signals are used to adjust the bias states of the drive transistor correspondingly to enable the display panel to have a high display uniformity. Within a data refresh frequency band, the bias adjustment signal may be increased or decreased according to practical requirements. When a data refresh frequency in a low frequency band is raised to be in a high frequency band, the bias adjustment signal can be adaptively increased to ensure that the large bias adjustment signal can quickly adjust the bias state of the drive transistor T2 to meet the refresh requirement of the high data refresh frequency.

In some embodiments, a difference between a maximum data refresh frequency within the first data refresh frequency band and a minimum data refresh frequency within the first data refresh frequency band is $\Delta F1$, and a difference between a maximum data refresh frequency within the second data refresh frequency band and a minimum data refresh frequency within the second data refresh frequency band is $\Delta F2$, satisfying $\Delta F1>\Delta F2$.

In some embodiments, in a case where the display panel has a high data refresh frequency, the total duration of the holding frames is short, and the drive transistor T2 is not necessarily biased. Therefore, a span of the data refresh frequencies included in the high frequency band is large, and the bias adjustment signal may be adaptively adjusted within this frequency band. When the display panel works at a lower data refresh frequency, the total duration of the holding frames is long, the drive transistor T2 is severely biased, and the difference between the total durations of the holding frames at different data refresh frequencies is large, for example, the difference between the total duration of the holding frames at the data refresh frequency of 10 HZ and the total duration of the holding frames at the data refresh frequency of 1 HZ is very large. Therefore, a span of the data refresh frequencies included in the lower frequency band is small to alleviate the phenomenon that the drive transistor is severely biased at low data refresh frequencies.

In some embodiments, in a case where data refresh frequencies of the display panel include a first data refresh frequency F1 and a second data refresh frequency F2, and F1>F2, at the first data refresh frequency F1, a duration of a bias adjustment stage in one data refresh period is T1, and at the second data refresh frequency F2, a duration of a bias adjustment stage in one data refresh period is T2, and T1 and T2 satisfy T1>T2, or, T1<T2.

In some embodiments, in a case where the data refresh frequency is low, the total duration of the holding frames is long, which causes the threshold voltage drifts of the drive transistor to be severer, and in this case, the duration of the bias adjustment stage may be set to be long to alleviate or eliminate the drift of the threshold voltage of the drive transistor. Accordingly, in a case where the data refresh frequency is high, the total duration of the holding frames is short, so that the threshold voltage drift of the drive transistor is not obvious. In this case, the duration of the bias adjustment stage may be set to be short to meet the refresh requirement of the high data refresh frequency on the premise that the drift of the threshold voltage of the drive transistor can be alleviated or eliminated.

It is to be noted that, the above-described is only one implementation of an embodiment of the present disclosure, the bias adjustment signal provided may take into account other controllable or uncontrollable factors in addition to the above-described cases. Therefore, at different data refresh frequencies, the durations (T1, T2) of the bias adjustment stages may also satisfy T1>T2.

In some embodiments, at the first data refresh frequency F1, a duration of a bias adjustment stage within one image frame is t1, at the second data refresh frequency F2, a duration of a bias adjustment stage within one image frame is t2, and t1 and t2 satisfy t1>t2, or t1<t2.

In some embodiments, one data refresh period may include many frames, for example, one data refresh period may include a data writing frame and multiple holding frames, and generally when the data refresh frequency is lower, the data refresh period is longer, therefore the threshold voltage drift of the drive transistor in each frame during this data drive period is severer. In this case, at a low data refresh frequency, the duration of the bias adjustment stage in each frame of one data refresh period is set to be long to alleviate or eliminate the threshold voltage drift of the drive transistor. Accordingly, at a high data refresh frequency, the data refresh period is short, therefore, the threshold voltage drift of the drive transistor is not obvious, and in this case, the duration of the bias adjustment stage in each frame of one data refresh period can be set to be short to meet the refresh requirement of the high data refresh frequency on the premise that the threshold voltage drift of the drive transistor can be alleviated or eliminated.

It is to be noted that, the above-described is only one implementation of embodiments of the present disclosure, the bias adjustment signal provided may take into account other controllable or uncontrollable factors in addition to the above-described cases. Therefore, at different data refresh frequencies, the durations (t1, t2) of the bias adjustment stages in one image frame may also satisfy t1>t2.

Figure 16:
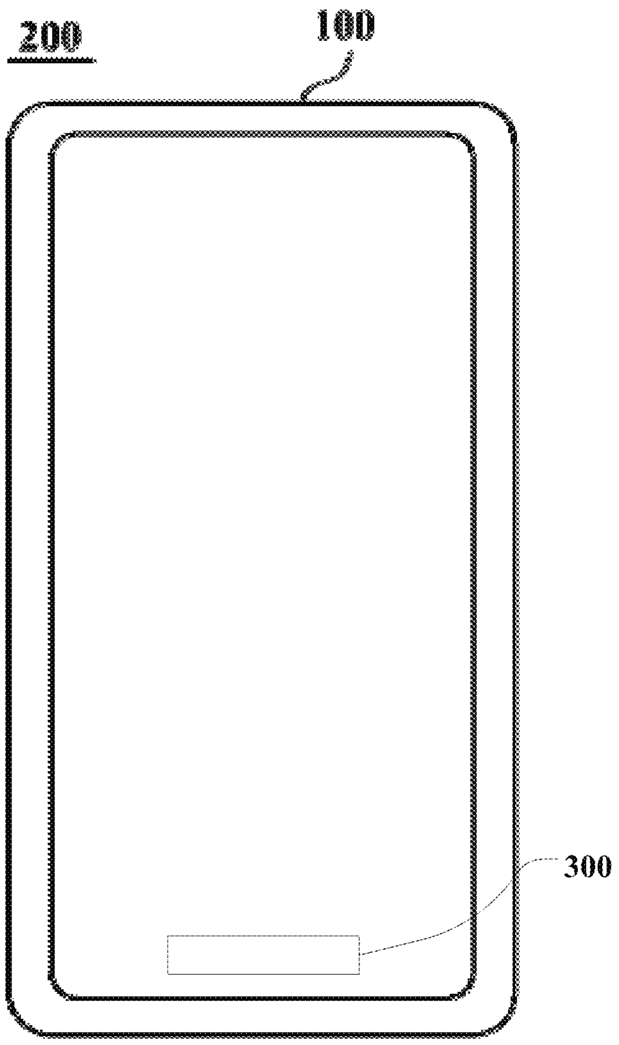
FIG. 16 is a schematic structural diagram of a display apparatus according to an embodiment of the present disclosure.

FIG. 16 is a schematic structural diagram of a display apparatus according to an embodiment of the present disclosure. As shown in FIG. 16, an integrated chip 300 is further provided according to embodiments of the present disclosure. The integrated chip 300 is configured to provide signals to a display panel 100 according to an embodiment of the present disclosure, where the display panel 100 includes a pixel circuit and a light emitting element, and the pixel circuit includes a drive module, a bias adjustment module, and an initialization module. The drive module is configured to provide a drive current to the light emitting element, and the drive module includes a drive transistor. The bias adjustment module is configured to provide a bias adjustment signal to a first pole of the drive transistor or a second pole of the drive transistor. The initialization module is configured to provide an initialization signal to the light emitting element.

Operation modes of the display panel 100 include a first mode and a second mode, and brightness level of the display panel 100 in the first mode is greater than brightness level of the display panel 100 in the second mode.

The integrated chip 300 is configured to provide a bias adjustment signal Vs1 in the first mode and to provide a bias adjustment signal Vs2 in the second mode, satisfying Vs1≠Vs2; and/or, the integrated chip 300 is configured to provide an initialization signal Vi1 in the first mode and an initialization signal Vi2 in the second mode, satisfying Vi1≠Vi2.

With further reference to FIG. 16, a display apparatus 200 is further provided according to embodiments of the present disclosure, the display apparatus 200 may include the above display panel 100 according to the embodiments of the present disclosure. Therefore, the display apparatus 200 has the display panel 100 according to the embodiments of the present disclosure, and can achieve the beneficial effects of the display panel 100 according to the embodiments of the present disclosure. For the same embodiments, reference may be made to the description of the display panel 100 according to the embodiments of the present disclosure, and details are not described herein again.

For example, the display apparatus 200 according to the embodiment of the present disclosure may be any electronic product having a display function, including but not limited to the following categories: a mobile phone, a television set, a notebook computer, a desktop display, a tablet computer, a digital camera, a smart band, smart glasses, a car display, a medical device, an industrial control device, a touch interaction terminal, and the like, which are not particularly limited in the embodiments of the present disclosure.

What is claimed is:

1. A display panel, comprising:

a pixel circuit and a light emitting element;

wherein the pixel circuit comprises a drive module, and an initialization module;

the drive module comprises a drive transistor; and the initialization module is configured to provide an initialization signal to the light emitting element;

wherein operation modes of the display panel comprise a first mode and a second mode, and a brightness level of the display panel in the first mode is greater than a brightness level of the display panel in the second mode; and wherein an operation process of the pixel circuit comprises a data writing frame and a holding frame;

the data writing frame in the first mode corresponds to an initialization signal of Vi11, and the holding frame in the first mode corresponds to an initialization signal of Vi12;

the data writing frame in the second mode corresponds to an initialization signal of Vi21, and the holding frame in the second mode corresponds to an initialization signal of Vi22; and $$|Vi11-Vi12|\neq|Vi21-Vi22|.$$

2. The display panel according to claim 1, wherein $|Vi11-Vi12|<|Vi21-Vi22|$.

3. The display panel according to claim 1, wherein $|Vi11-Vi12|>|Vi21-Vi22|$.

4. The display panel according to claim 1, wherein the pixel circuit further comprises a reset module and a compensation module, the reset module is configured to provide a reset signal to the drive transistor, and the compensation module is connected between a gate of the drive transistor and a second pole of the drive transistor; and wherein the reset module is connected to the gate of the drive transistor, and the reset module is configured to provide a reset signal to the gate of the drive transistor in a reset stage; or, the reset module is connected to a first pole of the drive transistor or the second pole of the drive transistor, the reset module is served as a bias adjustment module, and the reset module is configured to provide a bias adjustment signal to the first pole of the drive transistor or the second pole of the drive transistor in a bias adjustment stage.

5. The display panel according to claim 1, wherein the pixel circuit further comprises a bias adjustment module, and the bias adjustment module is configured to provide a bias adjustment signal to a first pole of the drive transistor or a second pole of the drive transistor.

6. The display panel according to claim 5, wherein a brightness level of the display panel comprises a first brightness level segment and a second brightness level segment, a brightness level value within the first brightness level segment is greater than a brightness level value within the second brightness level segment; and wherein the bias adjustment signal within the first brightness level segment is unchanged, and the bias adjustment signal within the second brightness level segment is unchanged, and the bias adjustment signal within the first brightness level segment is not equal to the bias adjustment signal within the second brightness level segment.

7. The display panel according to claim 5, wherein the bias adjustment module comprises a bias adjustment transistor, a gate of the bias adjustment transistor is configured to receive a scanning signal, and the scanning signal is used to control the bias adjustment transistor to be turned-on or to be turned-off.

8. The display panel according to claim 7, wherein the data writing frame in the first mode corresponds to a bias adjustment signal of Vs11, and the holding frame in the first mode corresponds to a bias adjustment signal of Vs12;

the data writing frame in the second mode corresponds to a bias adjustment signal of Vs21, and the holding frame in the second mode corresponds to a bias adjustment signal of Vs22; and $$|Vs11-Vs12|=|Vs21-Vs22|.$$

9. The display panel according to claim 7, wherein the data writing frame in the first mode corresponds to a bias adjustment signal of Vs11, and the holding frame in the first mode corresponds to a bias adjustment signal of Vs12;

the data writing frame in the second mode corresponds to a bias adjustment signal of Vs21, and the holding frame in the second mode corresponds to a bias adjustment signal of Vs22; and $$|Vs11-Vs12|\neq|Vs21-Vs22|.$$

10. The display panel according to claim 7, wherein $|Vs11-Vs12|>|Vs21-Vs22|$.

11. The display panel according to claim 7, wherein $|Vs11-Vs12|<|Vs21-Vs22|$.

12. The display panel according to claim 1, wherein one image frame of the display panel comprises a non-light-emitting stage and a light-emitting stage, and a duration of the light-emitting stage in the first mode is greater than a duration of the light-emitting stage in the second mode.

13. The display panel according to claim 1, wherein the pixel circuit further comprises a data writing module configured to provide a data signal to the drive transistor, and wherein a data signal received by the drive transistor in the first mode is not equal to a data signal received by the drive transistor in the second mode.

14. The display panel according to claim 1, wherein the drive transistor comprises an N-type transistor, or, a P-type transistor.

15. A display apparatus, comprising a display panel, wherein the display panel comprises:

a pixel circuit and a light emitting element;

wherein the pixel circuit comprises a drive module, and an initialization module;

the drive module comprises a drive transistor; and the initialization module is configured to provide an initialization signal to the light emitting element;

wherein operation modes of the display panel comprise a first mode and a second mode, and a brightness level of the display panel in the first mode is greater than a brightness level of the display panel in the second mode; and wherein an operation process of the pixel circuit comprises a data writing frame and a holding frame;

the data writing frame in the first mode corresponds to an initialization signal of Vi11, and the holding frame in the first mode corresponds to an initialization signal of Vi12;

the data writing frame in the second mode corresponds to an initialization signal of Vi21, and the holding frame in the second mode corresponds to an initialization signal of Vi22; and $$|Vi11-Vi12|\neq|Vi21-Vi22|.$$

16. A display panel, comprising:

a pixel circuit and a light emitting element;

wherein the pixel circuit comprises a drive module, an initialization module, a data writing module and a bias adjustment module;

the drive module comprises a drive transistor;

the initialization module is configured to provide an initialization signal to the light emitting element;

the data writing module is configured to provide a data signal to the drive transistor; and the bias adjustment module is configured to provide a bias adjustment signal to a first pole of the drive transistor or a second pole of the drive transistor;

wherein operation modes of the display panel comprise a first mode and a second mode, and a brightness level of the display panel in the first mode is greater than a brightness level of the display panel in the second mode; and wherein an operation process of the pixel circuit comprises a data writing frame and a holding frame;

the data writing frame in the first mode corresponds to an initialization signal of Vi11, and the holding frame in the first mode corresponds to an initialization signal of Vi12;

the data writing frame in the second mode corresponds to an initialization signal of Vi21, and the holding frame in the second mode corresponds to an initialization signal of Vi22; and $$|Vi11-Vi12|\neq|Vi21-Vi22|.$$

17. The display panel according to claim 16, wherein $|Vi11-Vi12|>|Vi21-Vi22|$.

18. The display panel according to claim 16, wherein |Vi11−Vi12|<|Vi21−Vi22|.

19. The display panel according to claim 16, wherein the bias adjustment module is configured to provide the bias adjustment signal to the first pole of the drive transistor or the second pole of the drive transistor in a bias adjustment stage; and the data writing module is configured to provide the data signal to the drive transistor in a data writing stage.

20. A display apparatus, comprising the display panel according to claim 16.

* * * * *